United States Patent
Akutagawa

(10) Patent No.: US 6,383,539 B1
(45) Date of Patent: May 7, 2002

(54) METHOD OF MANUFACTURING DECORATIVE FOOD, NOZZLE ASSEMBLY AND DECORATIVE CHOCOLATE

(75) Inventor: Tokuji Akutagawa, Tokyo (JP)

(73) Assignee: Akutagawa Confectionery Co., Ltd., Tokyo (JP)

( * ) Notice: Subject to any disclaimer, the term of this patent is extended or adjusted under 35 U.S.C. 154(b) by 0 days.

(21) Appl. No.: 09/230,631
(22) PCT Filed: May 28, 1998
(86) PCT No.: PCT/JP98/02355
  § 371 Date: May 17, 1999
  § 102(e) Date: May 17, 1999
(87) PCT Pub. No.: WO98/53699
  PCT Pub. Date: Dec. 3, 1998

(30) Foreign Application Priority Data

May 28, 1997 (JP) ............................................. 9-138618

(51) Int. Cl.[7] ............................. B29C 45/16; A23G 1/20
(52) U.S. Cl. ........................ 426/249; 426/383; 426/515; 426/516; 426/660; 426/104; 425/130
(58) Field of Search .................................. 426/249, 515, 426/516, 104, 383, 660; 425/130

(56) References Cited

U.S. PATENT DOCUMENTS

| | | | | |
|---|---|---|---|---|
| 1,628,251 A | * | 5/1927 | Laskey | |
| 1,839,719 A | * | 1/1932 | Walter | |
| 1,865,097 A | * | 6/1932 | Gilham | |
| 2,874,649 A | * | 2/1959 | Pelletier | |
| 2,893,605 A | * | 7/1959 | Anderson | |
| 3,307,503 A | * | 3/1967 | Elmer et al. | |
| 3,342,143 A | * | 9/1967 | Bell | |
| 3,545,981 A | * | 12/1970 | Klein et al. | |
| 3,690,896 A | * | 9/1972 | Maxwell | |
| 3,876,743 A | * | 4/1975 | Soderlund et al. | |
| 4,183,968 A | * | 1/1980 | Beckers et al. | |
| 4,369,200 A | * | 1/1983 | Iwao et al. | |
| 4,421,773 A | * | 12/1983 | Akutagawa | |
| 4,778,683 A | * | 10/1988 | Newsteder | |
| 4,925,380 A | * | 5/1990 | Meisner | |
| 5,019,404 A | * | 5/1991 | Meisner | |
| 5,425,958 A | * | 6/1995 | Fazio et al. | |
| 5,447,036 A | * | 9/1995 | Heinrich | |
| 6,039,554 A | * | 3/2000 | Akutagawa | |

FOREIGN PATENT DOCUMENTS

JP 62-42715 * 5/1983

OTHER PUBLICATIONS

Morgan, "Chocolate and Candy Cookbook", pp. 168–169, 1982.*

* cited by examiner

Primary Examiner—Cynthia L. Nessler
(74) Attorney, Agent, or Firm—Crosby, Heafey, Roach & May

(57) ABSTRACT

A nozzle assembly branching each stream of at least two fluidized food materials of different colors into multiple streams, and guiding the multiple streams to predetermined locations in a mold, the nozzle assembly including: an upper nozzle plate, at least one lower nozzle plate positioned below and in contact with the upper nozzle plate, each of the upper and lower nozzle plates having at least two discrete passages, each of the passages in the upper nozzle plate guiding one of the food materials in a substantially horizontal direction, and having at least one communication port each in communication with corresponding one of the passages in the lower nozzle plate, each of the passages in the lower nozzle plate having at least one discharge port for discharging one of the food materials into one of the one or more unit cavities, at least one of the passages in the lower nozzle plate being a horizontal guide passage for guiding one of the food materials in a substantially horizontal direction.

6 Claims, 25 Drawing Sheets

Fig.2
(a)
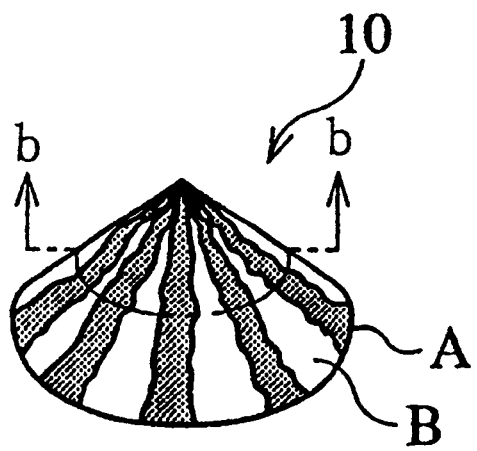
(b)
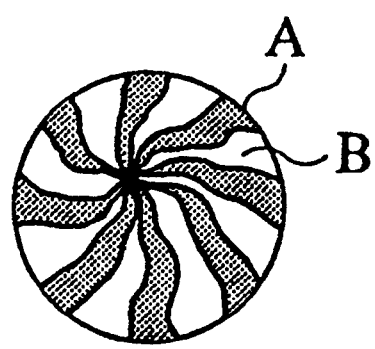

Fig.4
(a) 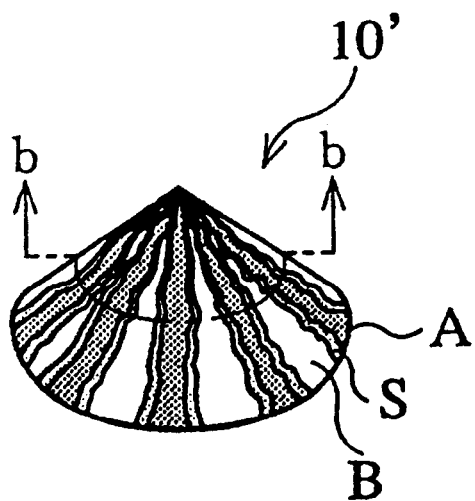
(b) 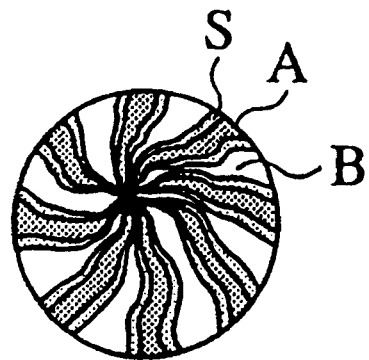

Fig. 11
(a) 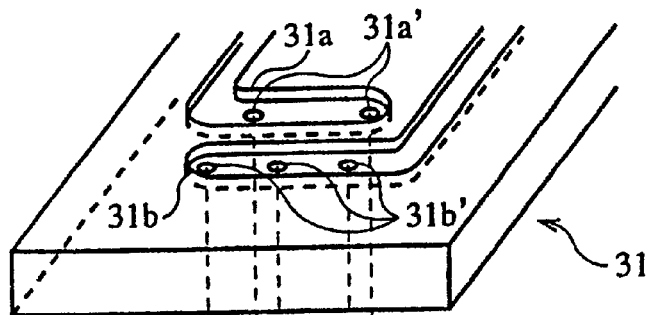
(b) 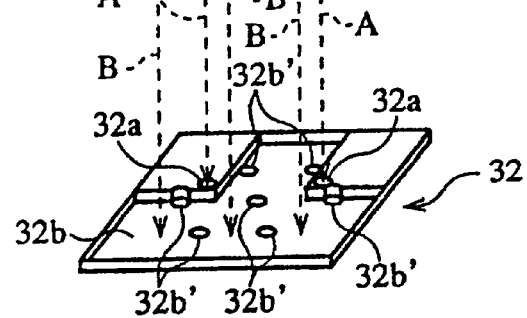
(c) 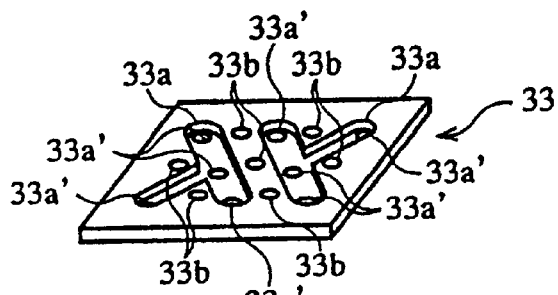
(d) 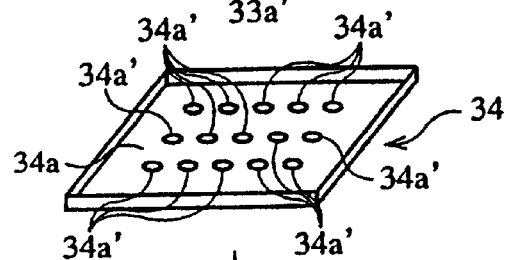
(e) 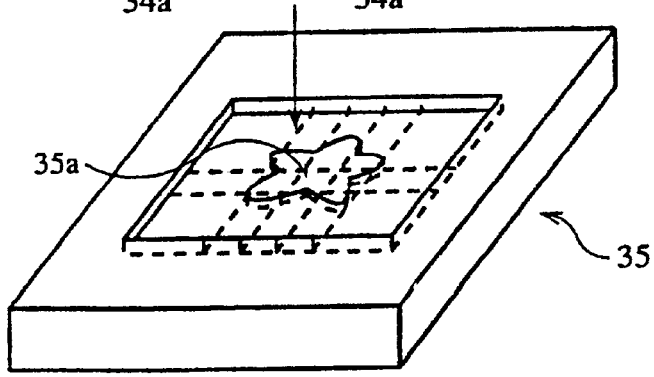

METHOD OF MANUFACTURING DECORATIVE FOOD, NOZZLE ASSEMBLY AND DECORATIVE CHOCOLATE

This application is a national stage application filed under 35 U.S.C. 371 of international application serial no. PCT/JP98/02355, filed May 28, 1998.

FIELD OF ART

The present invention relates to a method for producing decorative food having a pattern in two or more distinct colors by introducing a plurality of food materials of different colors, such as fluidized chocolate materials, into a mold; nozzle assemblies for such a method; and decorative chocolates produced by such a method.

BACKGROUND ART

Among conventional methods for producing decorative chocolates by introducing a plurality of fluidized chocolate materials of different colors into a mold to form patterns, there is known a method including the steps of mixing two or more chocolate materials of different colors in a storage tank in advance, and introducing the mixed materials into a mold. However, it is difficult with this method to maintain a fixed pattern of the decorative chocolates since the chocolate materials are mixed in the storage tank, and the storage tank lowers the spatial efficiency.

There is also known a method including the steps of separately introducing chocolate materials of different colors through separate vertically extending extending nozzles into a mold, allowing the streams of the chocolate materials to merge or mix in the mold, followed by solidification (for example, Japanese Laid-open Patent Application No. 9-23818). This method, however, requires combination of separate nozzles each extending vertically, which lowers spatial efficiency. In addition, combination and fixation of vertically extending nozzles are difficult. Thus, only limited patterns can be provided, and changes to desired patterns cannot be made easily. In addition, since the chocolate materials are not designed to be introduced simultaneously into the mold, a pattern in a plurality of colors can be formed only on the surface of the chocolates, but not deep inside thereof.

There is further known a method including the steps of introducing a fluidized chocolate material of a certain color into a mold, solidifying the same, then introducing another fluidized chocolate material of different color into the mold, and solidifying the same. However, this method requires the chocolate materials to be introduced into the mold in two or more layers. This complicates the process, and the interface between the materials of different colors cannot be made smooth.

DISCLOSURE OF THE INVENTION

It is an object of the present invention to provide an industrially applicable and effective method for producing decorative food, that enables easy production of decorative food having a pattern in two or more distinct colors, that enables continuous and efficient production of such decorative foods having substantially the identical patterns, and that facilitates pattern change to desired patterns.

It is another object of the present invention to provide a nozzle assembly which enables efficient production of decorative food having a pattern in two or more distinct colors in a limited space, which facilitates pattern change to a variety of desired patterns, and which can be used for industrial production of decorative food.

It is another object of the present invention to provide a decorative chocolate which has an excellently regular pattern in two or more distinct colors, smooth surface, and visually excellent interfaces between the materials of different colors.

According to the present invention, there is provided a method for producing decorative food having a pattern in two or more distinct colors by introducing at least two fluidized food materials of different colors into a mold having one or more unit cavities, comprising the steps of:

separately measuring out a predetermined amount of each of said food materials for introduction into said mold, separately but substantially simultaneously supplying each of said measured food materials to an introduction region above a nozzle assembly having at least two discrete passages, each said introduction region communicating with said passages, advancing each of said food materials in a substantially horizontal direction in said nozzle assembly, while a stream of each of said food materials is branched to form branched streams of each of said food materials, separately discharging said branched streams of each of said food materials from lower portion of said nozzle assembly, substantially simultaneously introducing said separately discharged branched streams into one of said one or more unit cavities to allow merging of said streams, and solidifying said merged streams of said food materials to form a solidified food, and demolding the solidified food.

According to the present invention, there is also provided a method for producing decorative food as mentioned above, comprising the steps of:

separately measuring out a predetermined amount of each of said food materials for introduction into said mold, separately but substantially simultaneously supplying each of said measured food materials to an introduction region above a nozzle assembly having at least two discrete passages, each said introduction region communicating with said passages, advancing each of said food materials in a substantially horizontal direction in said nozzle assembly, while a stream of each of said food materials is branched to form branched streams of each of said food materials, merging said branched streams of each of said food materials immediately before introduction into the mold, and discharging merged streams of said food materials from lower portion of said nozzle assembly, substantially simultaneously introducing discharged merged streams of said food materials into one of said one or more unit cavities, solidifying said merged streams of said food materials to form a solidified food, and demolding the solidified food.

According to the present invention, there is further provided a nozzle assembly for use in the aforementioned method for producing decorative food, said nozzle assembly branching each stream of at least two fluidized food materials of different colors into multiple streams, and guiding said multiple streams to predetermined locations in a mold having one or more unit cavities, said nozzle assembly comprising:

an upper nozzle plate, at least one lower nozzle plate positioned below and in contact with said upper nozzle plate, each of said upper and lower nozzle plates having at least two discrete passages, each of said passages in said upper nozzle plate guiding one of said food materials in a substantially horizontal direction, and having at least one communication port each in communication with corresponding one of said passages in said lower nozzle plate, each of said passages in said lower nozzle plate having at least one discharge port for discharging one of said food materials into one of said one or more unit cavities, at least one of said passages in the lower nozzle plate being a horizontal guide passage for guiding one of said food materials in a substantially horizontal direction, wherein number of said at least one discharge port of each said horizontal guide passage is larger than number of said at least one communication port of a passage in the upper nozzle plate in communication with said horizontal guide passage.

According to the present invention, there is also provided a decorative chocolate produced by the above method having a pattern in two or more distinct colors on its surface and continuously deep inside, wherein interfaces between said food materials of different colors on its surface are smooth.

BRIEF DESCRIPTION OF THE DRAWINGS

FIG. 2(a) is a perspective view of a decorative chocolate produced using the nozzle assembly of FIG. 1, and FIG. 2(b) is a cross-sectional view taken along line b—b in FIG. 2(a).

FIG. 4(a) is a perspective view of a decorative chocolate produced using the nozzle assembly of FIG. 3, and FIG. 4(b) is a cross-sectional view taken along line b—b in FIG. 4(a).

FIGS. 11(a) to 11(d) show in an exploded perspective view an embodiment of the nozzle assembly of the present invention, and FIG. 11(e) is a perspective view of an example of a mold.

DESCRIPTION OF THE INVENTION

Figure 1:
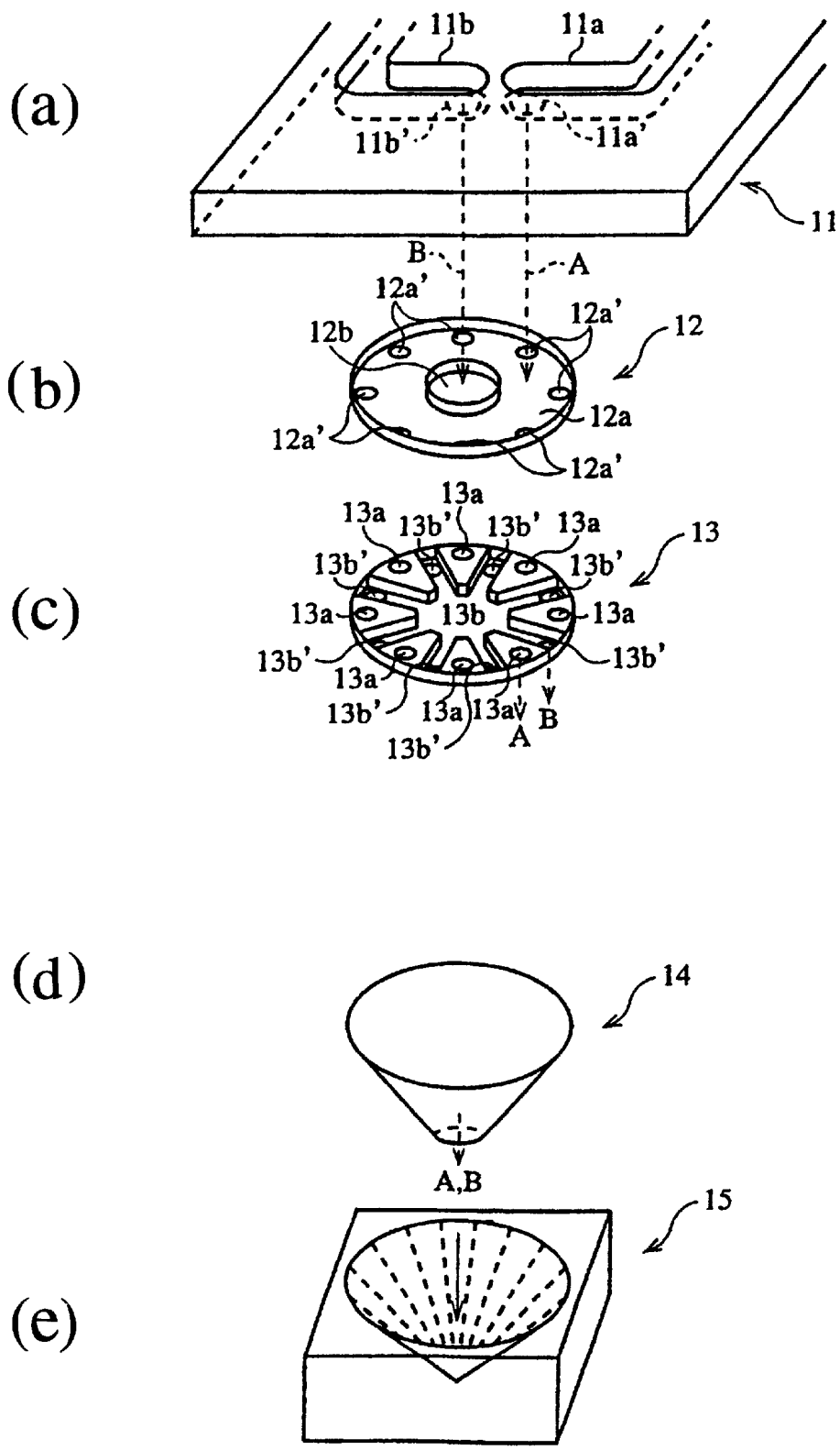
FIGS. 1(a) to 1(d) show in an exploded perspective view an embodiment of the nozzle assembly of the present invention.
FIG. 1(e) is a perspective view of an example of a mold.

The method of the present invention is a method for producing decorative food having a pattern in two or more distinct colors by introducing at least two fluidized food materials of different colors into a mold having one or more unit cavities.

The fluidized food materials may be, for example, chocolate materials; paste-like materials such as fish cakes; jelly materials, or materials for baked confectioneries such as cookies and cakes. The viscosity of the food materials may suitably be selected depending on the desired pattern so that the food materials of different colors are substantially simultaneously introduced into the mold. In the present invention, colors include black and white.

The unit cavity is a compartment in a mold for producing one decorative chocolate. A mold may have one or more compartments. For industrial mass production, a mold preferably has a plurality of compartments or unit cavities.

In the method of the present invention, first a predetermined amount of each of the food materials for introduction into the mold is measured out. This measurement may be carried out, for example, by a depositor with weight scale.

In the method of the present invention, each of the measured food materials is separately but substantially simultaneously supplied to an introduction region above a nozzle assembly having at least two discrete passages, each introduction region communicating with the passages; each of the materials is advanced in a substantially horizontal direction in the nozzle assembly while a stream of each of the materials is branched to form branched streams of each of the materials; and the branched streams of each of the materials are separately discharged from the lower portion of the nozzle assembly.

The nozzle assembly used in this method may be the ones to be described later. This nozzle assembly enables substantially simultaneous supplying of each of the food materials to an introduction region, followed by separate but simultaneous discharge of each of the materials from the lower portion of the nozzle assembly without allowing merging of the materials. using the mold The nozzle assembly also enables advancement of each of the food materials supplied from each introduction region in the substantially horizontal direction, and branching of a stream of each of the materials into a desired increased number. Therefore, the pattern of the decorative food to be produced may be designed in a variety of ways, and the spatial efficiency of the overall apparatus including the nozzle assembly can be improved. Accordingly, desired decorative food can be produced efficiently.

In the method of the present invention, separately discharged branched streams of each of the food materials are separately discharged from the lower portion of the nozzle assembly, substantially simultaneously introduced into a unit cavity to merge, and the merged streams of the materials are solidified to form a solidified food. The solidified food is then demolded in a conventional manner, thereby obtaining a decorative food. In the above steps, "to merge" means not to mix the food materials of different colors, resulting in another color, but to bring the food materials of different colors into contact with each other with each of different colors being substantially maintained.

In the method of the present invention, instead of introducing the streams of each of the food materials substantially simultaneously into a unit cavity to allow merging of the streams, the streams of each of the materials, after branched in the nozzle assembly, may be merged immediately before introduction into the mold, and discharged from the lower portion of the nozzle assembly. Then, the merged streams of the food materials are solidified to form a solidified food, which is then demolded. By merging the branched streams of each of the food materials immediately before introduction into the mold, complicated patterns such as wave patterns can be formed, or colors of the merged food materials at the interfaces thereof can be caused to grade in the mold. In this case, the colors of the food materials are graded only at the interfaces between the materials, so that the obtained decorative food has a pattern in two or more distinct colors.

The nozzle assembly of the present invention is for use in the method for producing decorative food mentioned above, and for branching each stream of at least two fluidized food materials of different colors into multiple streams, and guiding the multiple streams to predetermined locations in a mold having one or more unit cavities.

The nozzle assembly has an upper nozzle plate, and at least one lower nozzle plate positioned below and in contact with the upper nozzle plate. Each of the upper and lower nozzle plates has at least two discrete passages. It is preferable for industrial use that a plurality of lower nozzle plates are arranged side by side on the lower surface of the upper nozzle plate. In the nozzle assembly of the present invention, a "plate" means not a vertically extending nozzle nor vertically extending member such as a conventional storage tank for mixing chocolate materials in advance, but a thinnest possible board-like member. With the nozzle configured as a plate, spatial efficiency can be improved, and each food material can be supplied to a mold in a shorter time than with a conventional vertically elongated nozzle, under the same supply pressure and at the same viscosity of the food materials supplied to the nozzle. Therefore, the production efficiency can be improved.

In the nozzle assembly of the present invention, each of the passages in the upper nozzle plate guides one of the food materials in a substantially horizontal direction. Further, each of the passages in the upper nozzle plate has at least one communication port each of which is in communication with corresponding one of the passages in the lower nozzle plate. Thus, streams of the food materials from the upper nozzle plate are supplied to the passages in the lower nozzle plate without merging. Each of the passages in the lower nozzle plate has at least one discharge port for discharging one of the food materials into a unit cavity. At least one of the passages in the lower nozzle plate is a horizontal guide passage for guiding one of the food materials in a substantially horizontal direction. Further, the nozzle assembly is so designed that the number of discharge ports provided in each horizontal guide passage is larger than the number of communication ports provided in a passage in the upper nozzle plate in communication with that horizontal guide passage.

Accordingly, the number of streams of food materials which have passed through each horizontal guide passage in the lower nozzle plate is larger than the number of streams of food materials which have been supplied to the upper nozzle plate. Therefore, by guiding the fewer number of supplied streams in a horizontal direction, the streams can easily be branched into the larger number of streams irrespective of the vertical length of the nozzle. Further, by combining the upper nozzle plate with at least one lower nozzle plate in many different ways, an extended variety of patterns can be designed easily.

The variety of the patterns can further be extended by providing a plurality of lower nozzle plates vertically in contact with each other, and by providing a merging nozzle for merging streams of the food materials in different colors discharged separately from the lower nozzle plate, and introducing merged streams of the materials into a unit cavity. The merging nozzle may also preferably be used in the aforementioned method for causing the colors of the merged food materials at the interfaces thereof to grade in the mold.

The decorative chocolate of the present invention has a pattern in two or more distinct colors on its surface and continuously deep inside, and the interfaces between the food materials of different colors on its surface are smooth. In the present invention, "having a pattern in two or more distinct colors on its surface and continuously deep inside" means that the pattern on the upper surface of the decorative chocolate in the mold is substantially similar to that of the cross-section of the chocolate.

At least a portion of the interfaces between different colors on the surface may have a graded pattern wherein the colors at the interfaces are mixed. Further, the decorative chocolate may have on its surface an excellently regular, complicated pattern wherein substantially identical designs are repeated twice or more times.

EXAMPLE

The present invention will now be explained in detail with reference to the embodiments in Examples, but the present invention is not limited thereto.

Example 1

FIG. 1 contains an exploded perspective view of a nozzle assembly composed of upper nozzle plate 11, first lower nozzle plate 12, second lower nozzle plate 13, and merging nozzle 14, and a perspective view of mold 15.

As shown in FIG. 1(a), the upper nozzle plate 11 has passages (11a, 11b) separate from each other, each of which horizontally guides a fluidized chocolate material. Each passage (11a, 11b) has a communication port (11a', 11b') which is in communication with corresponding one of the passages (12a, 12b) in the first lower nozzle plate 12 as shown in FIG. 1(b).

The passage 12a of the first lower nozzle plate 12 in FIG. 1(b) is a horizontal guide passage which guides horizontally and disperses chocolate material stream A supplied through the communication port 11a'. In the horizontal guide passage 12a, eight discharge ports 12a' are provided, corresponding to one communication port 11a' provided in the passage 11a in the upper nozzle plate.

On the other hand, the passage 12b supplies chocolate material stream B supplied through the communication port 11b', to the second lower nozzle plate 13 placed under the first lower nozzle plate 12 without allowing merging of the stream B with the stream A.

Each passage 13a in the second lower nozzle plate 13 in FIG. 1(c) supplies stream A supplied through each communication port 12a' to the merging nozzle 14 below without allowing merging.

Passage 13b is a horizontal guide passage which guides horizontally and disperse stream B supplied through the communication port 12b. In this horizontal guide passage 13a, eight discharge ports 13b' are provided, corresponding to one communication port of the passage 12b in the first lower nozzle plate.

The merging nozzle 14 positioned below the second lower nozzle plate 13 merges the streams (A, B) separately discharged through the discharge ports 13a and 13b, guides and introduces to the mold 15. At this stage, since the temperature of the chocolate materials drops quickly, the streams of the chocolate materials are hardly mixed in the mold 15, and thus solidified, forming a pattern in two or more distinct colors, with the color of each chocolate material being maintained, i.e., with the streams not being mixed but merely merged.

The upper nozzle plate 11, the first lower nozzle plate 12, the second lower nozzle plate 13, and the merging nozzle 14 are assembled in contact with each other in this order before use. The upper nozzle plate 11 may be provided with a plurality of each of passages (11a, 11b), and the corresponding number of the first lower nozzle plates 12 may be attached to the upper nozzle plate 11, accompanied by the corresponding number of the second lower nozzle plates 13 and the merging nozzles 14. The mold 15 is placed below each of the merging nozzles 14, and a plurality of decorative chocolates having the substantially identical patterns may be produced simultaneously. The molds 15 may be separate or connected together.

With reference to FIG. 2, a decorative chocolate is briefly described next, which is obtained by separately supplying, from a depositor with a weight scale (not shown), a predetermined amount of each of the chocolate materials (A, B) of different colors to each of the passages (11a, 11b) in the upper nozzle plate 11 under pressure, using the nozzle assembly and the mold shown in FIG. 1.

FIG. 2(a) is a perspective view of decorative chocolate 10 produced using the nozzle assembly and the mold shown in FIG. 1. Even repeated production resulted in decorative chocolates having substantially identical patterns.

In the decorative chocolate 10, A and B are solidified chocolates of different colors corresponding to the chocolate material streams (A, B) respectively, described in FIG. 1. Each of the chocolates A and B appears repeatedly more than twice in the pattern. At the interfaces between the chocolates A and B, the colors of the chocolates were clearly distinguished, and the chocolates formed a smooth surface. Further, the cross-section of the decorative chocolate taken along line b—b in FIG. 2(a) is as shown in FIG. 2(b), showing a pattern substantially similar to a pattern seen when the decorative chocolate 10 is seen from above (or from below). Therefore, it is understood that the decorative chocolate 10 has the pattern in two or more distinct colors not only on its surface, but also continuously into deep inside.

Example 2

All of FIGS. 3(a) to 3(e), except for FIG. 3(d), are identical with the nozzle assembly and the mold as shown in FIG. 1, so that they will not be discussed further.

Reference numeral 14 in FIG. 3(d) refers to a merging nozzle similar to the one in FIG. 1(d), but this merging nozzle 14 is provided with a perforated plate 14a. The perforated plate 14a merges the chocolate material streams (A, B) discharged through the discharge ports (13a, 13b') of the second lower nozzle plate 13, and guides the streams merged through apertures 14a' downward. Thus, in the streams (A, B) which are discharged from the merging nozzle 14, guided, and introduced into the mold 15, some portions are mixed before filling the mold 15, so that the interfaces between the different colors in the pattern of the resulting decorative chocolate will be graded as will be described later.

Figure 3:
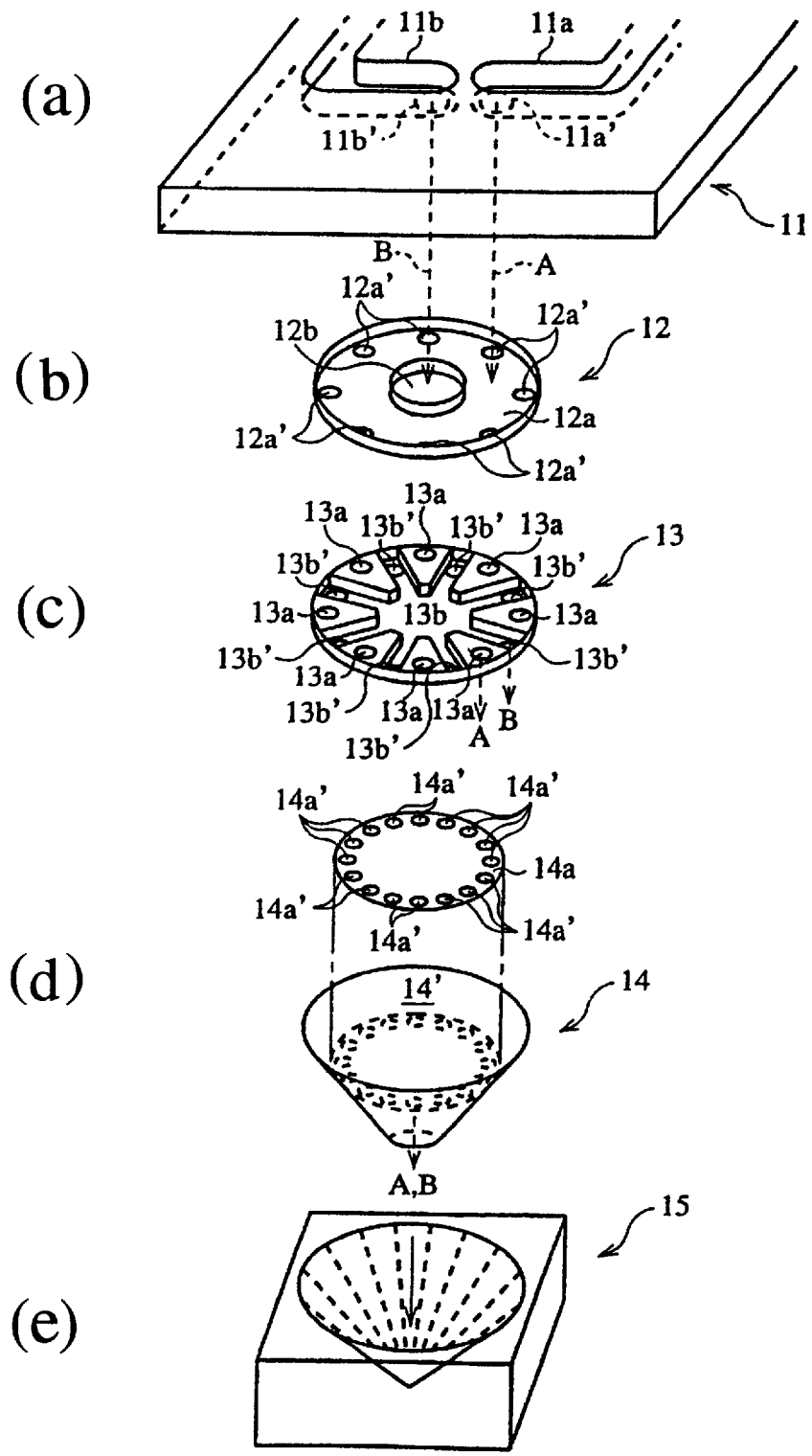
FIGS. 3(a) to 3(d) show in an exploded perspective view an embodiment of the nozzle assembly of the present invention.

Referring to FIG. 4, a decorative chocolate produced using the nozzle assembly and the mold shown in FIG. 3 is briefly described in the same way as in Example 1.

FIG. 4(a) is a perspective view of decorative chocolate 101 produced using the nozzle assembly and the mold shown in FIG. 3. Even repeated production resulted in decorative chocolates having substantially identical patterns.

In the decorative chocolate 10', A and B are solidified chocolates of different colors corresponding to the chocolate material streams (A, B), respectively, described in FIG. 1. Each of the chocolates A and B appears repeatedly more than twice in the pattern. At the interfaces between the chocolates A and B, graded patterns S are formed wherein the colors are mixed. However, the chocolates A and B of different colors are separated by the graded patterns S. The surface of the interfaces and the graded patterns S were all smooth. Further, the cross-section of the decorative chocolate taken along line b—b in FIG. 4(a) is as shown in FIG. 4(b), showing a pattern substantially similar to a pattern seen when the decorative chocolate 10' shown in FIG. 4(a) is seen from above (or from below). Therefore, it is understood that the decorative chocolate 10' has the pattern in two or more distinct colors not only on its surface, but also continuously into deep inside.

In Examples 1 and 2, the merging nozzle 14 is not always necessary. The resulting decorative chocolate has a pattern in two or more distinct colors not only on its surface, but also continuously into deep inside, and a smooth surface.

Example 3

Figure 5:
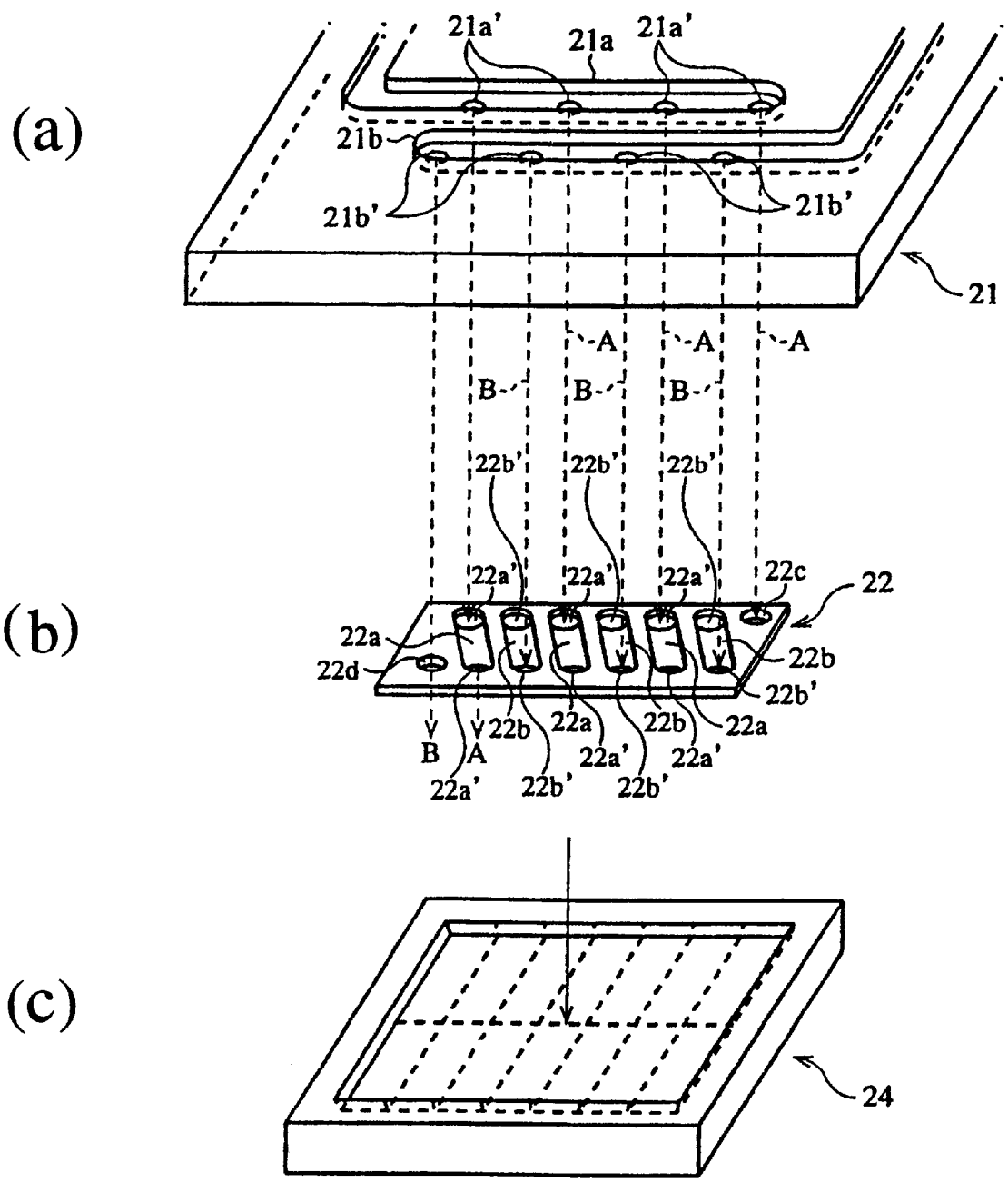
FIGS. 5(a) and 5(b) show in an exploded perspective view an embodiment of the nozzle assembly of the present invention.
FIG. 5(c) is a perspective view of an example of a mold.

FIG. 5 includes an exploded view of a nozzle assembly composed of upper nozzle plate 21 and lower nozzle plate 22, and a perspective view of mold 24.

The upper nozzle plate 21 in FIG. 5(a) has passages (21a, 21b) separate from each other, each of which horizontally guides a fluidized chocolate material. Each passage (21a, 21b) has communication ports (21a', 21b'), each of which is in communication with corresponding one of passages (22a–d) in the lower nozzle plate 22 as shown in FIG. 5(b).

The passages 22a of the lower nozzle plate 22 in FIG. 5(b) are horizontal guide passages, each of which guides horizontally and disperses chocolate material stream A supplied through communication port 21a'. In the horizontal guide passages 22a, six discharge ports 22a' are provided, corresponding to three of the communication ports 21a' provided in the passage 21a in the upper nozzle plate. The remaining one of the communication ports 21a' is in communication with passage 22c, which is a discharge port.

On the other hand, the passages 22b are horizontal guide passages, each of which guides horizontally and disperses chocolate material stream B supplied through communication port 21b'. In the horizontal guide passages 22b, six discharge ports 22b' are provided, corresponding to three of the communication ports 21b' provided in the passage 21b in the upper nozzle plate. The remaining one of the communication ports 21b' is in communication with passage 22d, which is a discharge port.

The upper nozzle plate 21 and the lower nozzle plate 22 are assembled in contact with each other in this order before use. By separately supplying a predetermined amount of each of the chocolate materials (A, B) of different colors to each of the passages (21a, 21b) in the upper nozzle plate 21 under pressure, the chocolate materials (A, B) pass through the lower nozzle plate 22 to be branched and guided to a predetermined locations in the mold 24, thereby forming a decorative chocolate having a desired pattern.

Figure 6:
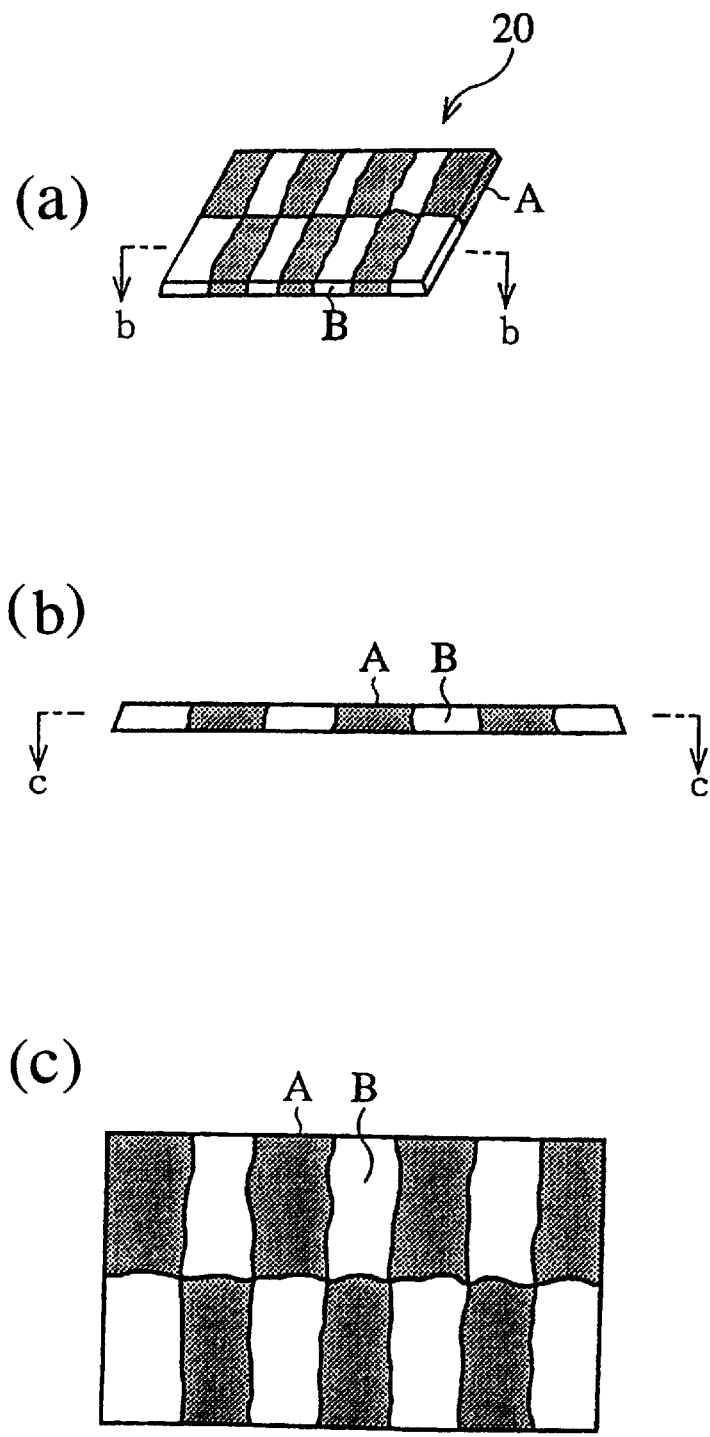
FIG. 6(a) is a perspective view of a decorative chocolate produced using the nozzle assembly of FIG. 5.
FIG. 6(b) is a vertical sectional view taken along line b—b in FIG. 6(a)
FIG. 6(c) is a cross-sectional view taken along line c—c in FIG. 6(b).

Next, with reference to FIG. 6, a decorative chocolate is briefly described, which is obtained by separately supplying, from a depositor with a weight scale (not shown), a predetermined amount of each of the chocolate materials (A, B) of different colors to each of the passages (21a, 21b) in the upper nozzle plate 21 under pressure, using the nozzle assembly and the mold shown in FIG. 5.

FIG. 6(a) is a perspective view of decorative chocolate 20 produced using the nozzle assembly and the mold shown in FIG. 5. Even repeated production resulted in decorative chocolates having substantially identical pattern.

In the decorative chocolate 20, A and B are solidified chocolates of different colors corresponding to the chocolate material streams (A, B), respectively, described in FIG. 5. Each of the chocolates A and B appears repeatedly more than twice in the pattern. At the interfaces between the chocolates A and B, the colors of the chocolates were clearly distinguished, and the chocolates formed a smooth surface. Further, the cross-section of the decorative chocolate taken along line b—b in FIG. 6(a) is as shown in FIG. 6(b). The cross-section of the decorative chocolate taken along line c—c in FIG. 6(b) is as shown in FIG. 6(c), showing a pattern substantially similar to a pattern seen when the decorative chocolate 20 is seen from above (or from below). Therefore, it is understood that the decorative chocolate 20 has the pattern in two or more distinct colors not only on its surface, but also continuously into deep inside.

Example 4

All of FIGS. 7(a) to 7(d), except for FIG. 7(c), are identical with the nozzle assembly and the mold as shown in FIG. 5, so that they will not be discussed further.

Reference numeral 23 in FIG. 7(c) refers to a merging nozzle having a horizontal guide passage 23a, which is provided with fourteen apertures 23a' functioning as discharge ports. The merging nozzle 23 merges the chocolate material streams (A, B) discharged through the discharge ports (23a'–d') of the lower nozzle plate 22, and guides the streams merged through apertures 23a' downward. Thus, in the streams (A, B) which are discharged from the merging nozzle 23, guided, and introduced into the mold 24, some portions are mixed before filling the mold 24, so that the interfaces between the different colors in the pattern of the resulting decorative chocolate will be graded as will be described later.

Figure 7:
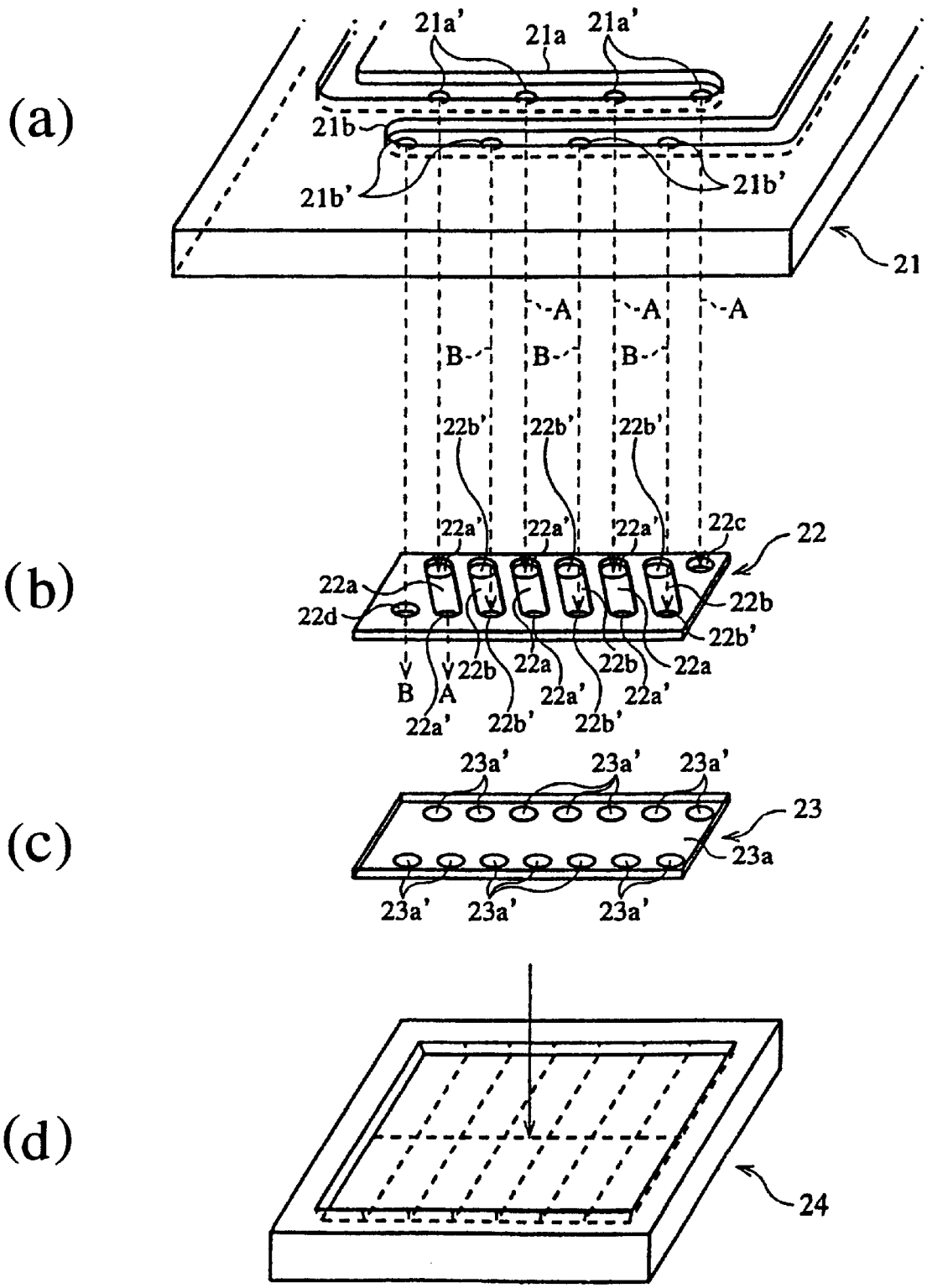
FIGS. 7(a) to 7(c) show in an exploded perspective view an embodiment of the nozzle assembly of the present invention.
FIG. 7(d) is a perspective view of an example of a mold.
Figure 8:
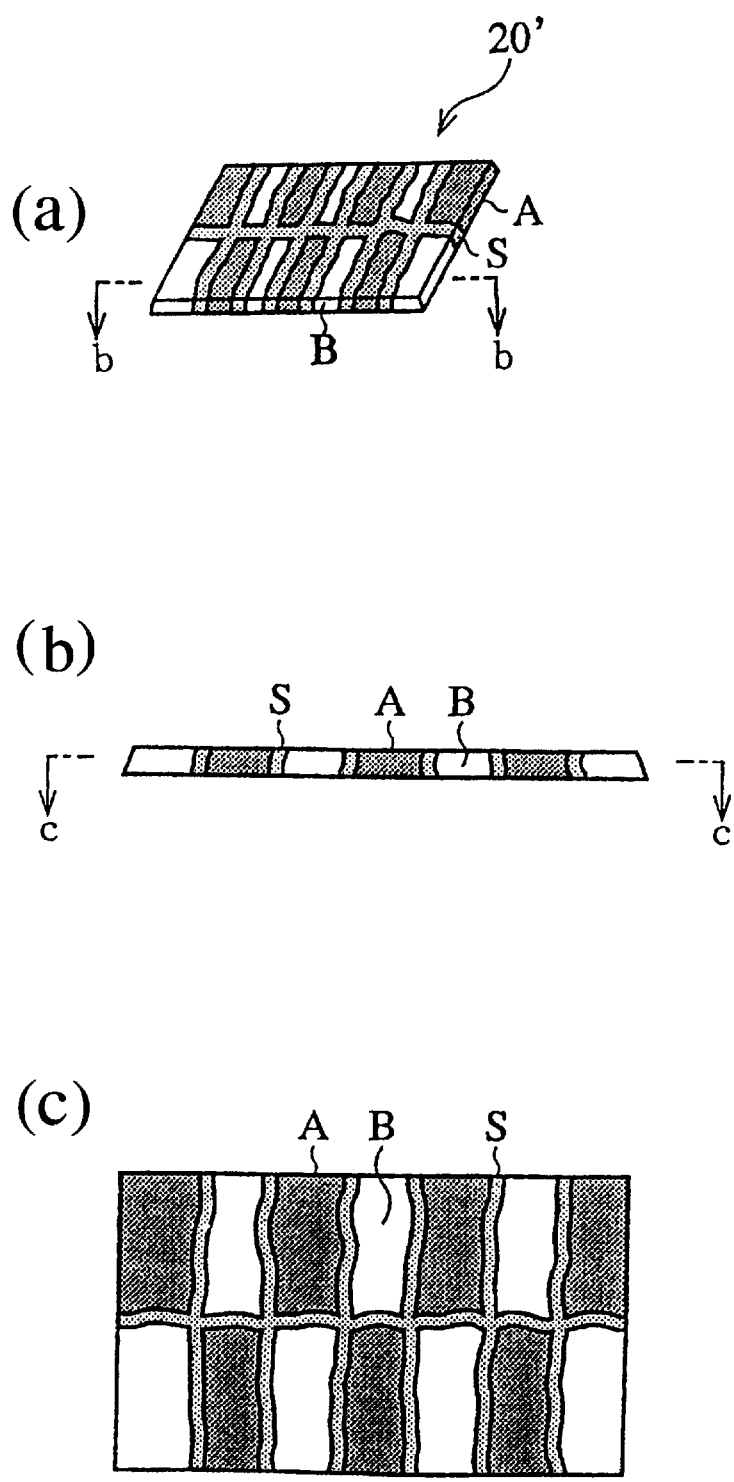
FIG. 8(a) is a perspective view of a decorative chocolate produced using the nozzle assembly of FIG. 7.
FIG. 8(b) is a vertical sectional view taken along line b—b in FIG. 8(a)
FIG. 8(c) is a cross-sectional view taken along line c—c in FIG. 8(b).

Referring to FIG. 8, a decorative chocolate produced using the nozzle assembly and the mold shown in FIG. 7 is briefly described in the same way as in Example 3

FIG. 8(a) is a perspective view of decorative chocolate 20' produced using the nozzle assembly and the mold shown in FIG. 7. Even repeated production resulted in decorative chocolates having substantially identical patterns.

In the decorative chocolate 20', A and B are solidified chocolates of different colors corresponding to the chocolate material streams (A, B) respectively, described in FIG. 5. Each of the chocolates A and B appears repeatedly more than twice in the pattern. At the interfaces between the chocolates A and B, graded patterns S are formed wherein the colors of the chocolates A and B are mixed. However, the chocolates A and B of different colors are separated by the graded patterns S. The surface of the interfaces and the graded patterns S were all smooth. Further, the cross-section of the decorative chocolate taken along line b—b in FIG. 8(a) is as shown in FIG. 8(b). The cross-section of the decorative chocolate taken along line c—c in FIG. 8(b) is as shown in FIG. 8(c), showing a pattern substantially similar to a pattern seen when the decorative chocolate 20' shown in FIG. 8(a) is seen from above (or from below). Therefore, it is understood that the decorative chocolate 20' has the pattern in two or more distinct colors not only on its surface, but also continuously into deep inside.

Example 5

Figure 9:
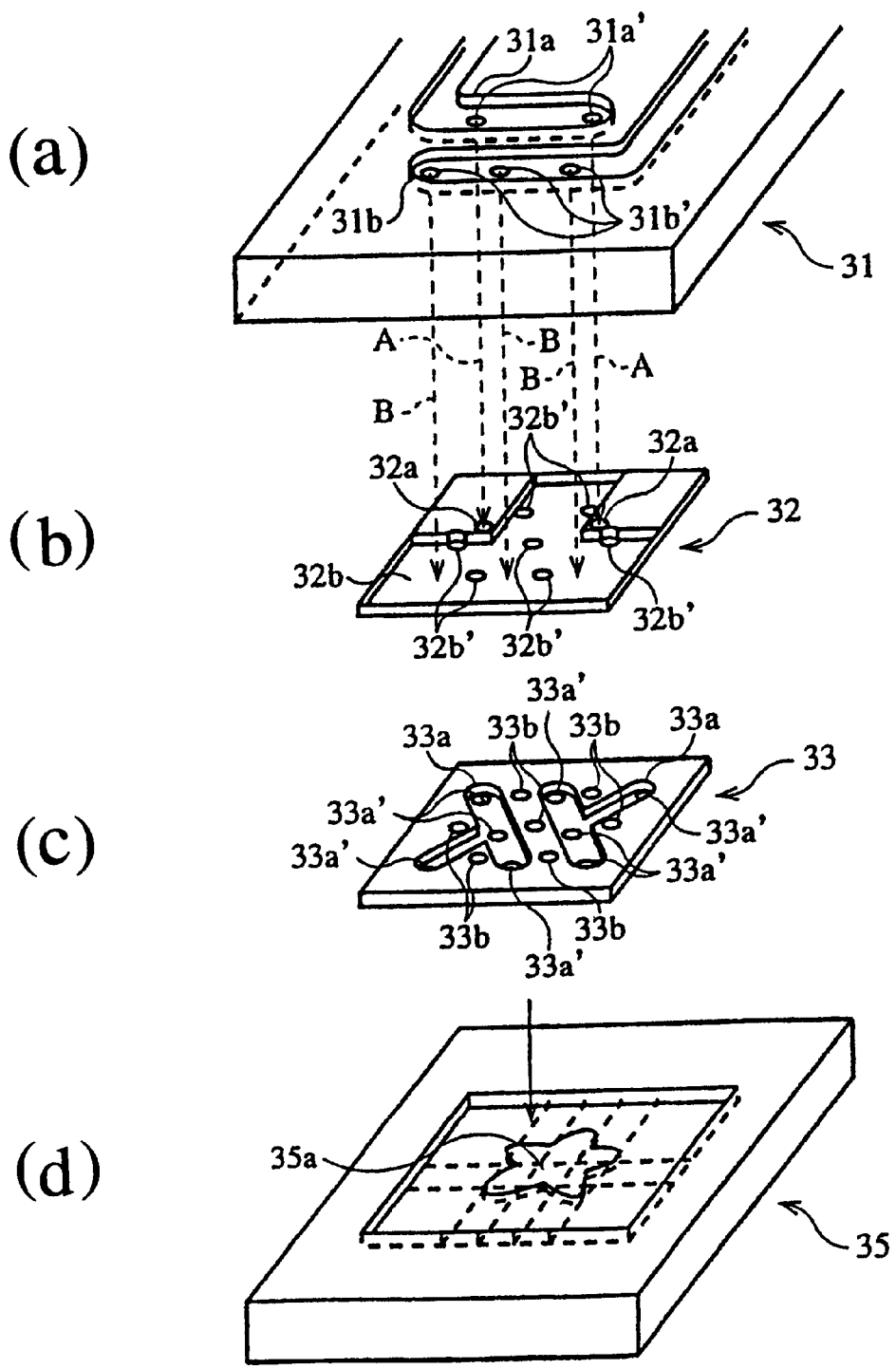
FIGS. 9(a) to 9(c) show in an exploded perspective view an embodiment of the nozzle assembly of the present invention.
FIG. 9(d) is a perspective view of an example of a mold.

FIG. 9 includes an exploded view of a nozzle assembly composed of upper nozzle plate 31, first lower nozzle plate 32, and second lower nozzle plate 33, and a perspective view of mold 35.

The upper nozzle plate 31 in FIG. 9(a) has passages (31a, 31b) separate from each other, each of which horizontally guides a fluidized chocolate material. Each passage (31a, 31b) has communication ports (31a', 31b'), each of which is in communication with corresponding one of passages (32a, 32b) in the first lower nozzle plate 32 as shown in FIG. 9(b).

Each passage 32a of the first lower nozzle plate 32 in FIG. 9(b) supplies chocolate material stream A supplied through each communication port 31a', to the second lower nozzle plate 33 placed under the first lower nozzle plate 32 without allowing merging of the stream A with the stream B.

On the other hand, the passage 32b is a horizontal guide passage which guides horizontally and disperses chocolate material streams B supplied through the communication ports 31b'. In the horizontal guide passage 32b, seven discharge ports 32b' are provided, corresponding to the three communication ports 31b' provided in the passage 31b in the upper nozzle plate.

The passages 33a of the second lower nozzle plate 33 in FIG. 9(c) are horizontal guide passages, each of which guides horizontally and disperses chocolate material streams A supplied through the communication ports 32a. In each passage 33a, four discharge ports 33a' are provided, corresponding to one communication port of each passage 32a in the first lower nozzle plate.

On the other hand, each passage 33b supplies chocolate material stream B supplied through each communication port 32b' to the mold 35 without allowing merging.

On the bottom of the mold 35, star-shaped bottom mold 35a is provided, which is to be charged with chocolate material C distinct from the chocolate material streams (A, B). The bottom mold 35a is charged with chocolate C of a color different from chocolate materials A and B, and solidified in advance. Then, the chocolate materials (A, B) are separately introduced into the mold 35.

The upper nozzle plate 31, the first lower nozzle plate 32, and the second lower nozzle plate 33 are assembled in contact with each other in this order before use.

Figure 10:
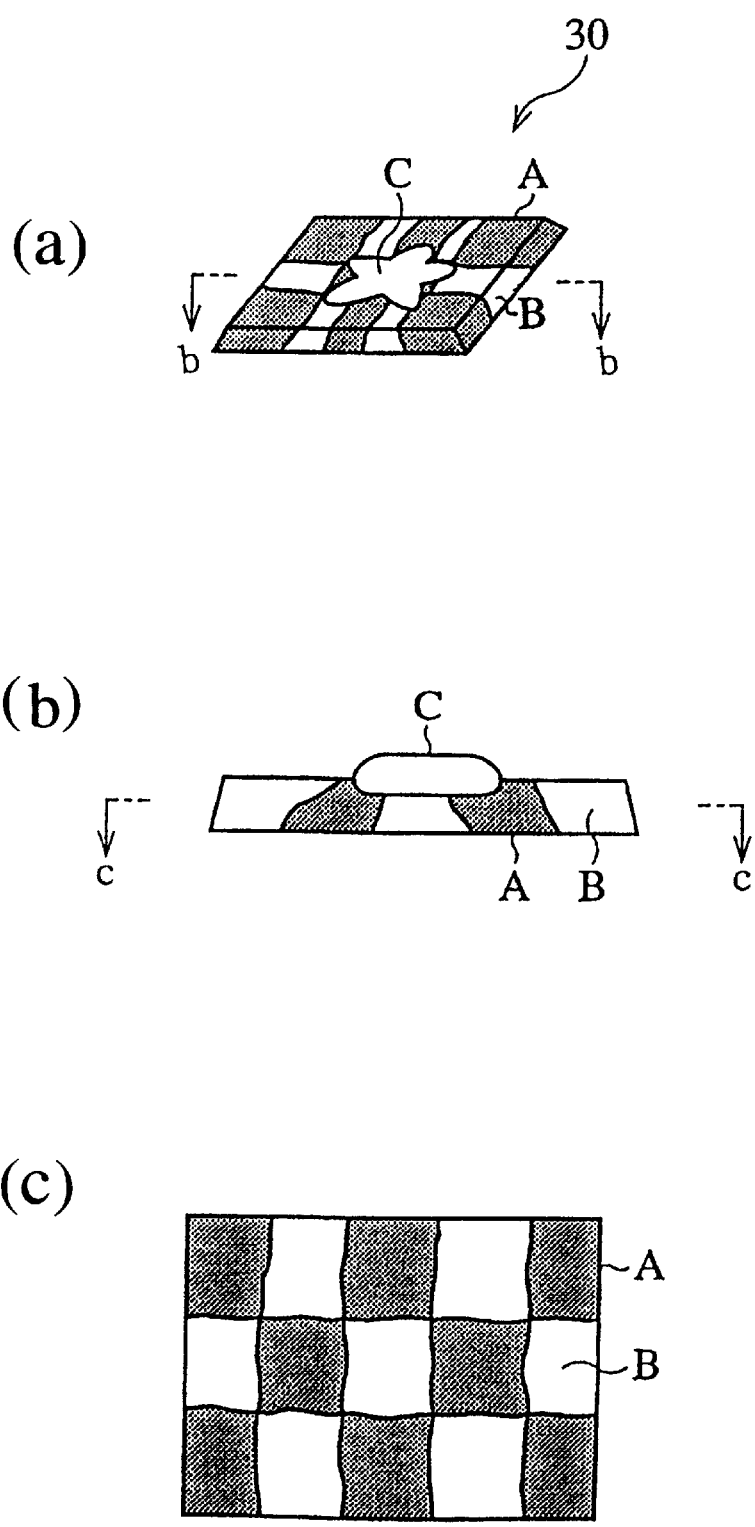
FIG. 10(a) is a perspective view of a decorative chocolate produced using the nozzle assembly of FIG. 9.
FIG. 10(b) is a vertical sectional view taken along line b—b in FIG. 10(a)
FIG. 10(c) is a cross-sectional view taken along line c—c in FIG. 10(b).

With reference to FIG. 10, a decorative chocolate is briefly described next, which is obtained by separately supplying, from a depositor with a weight scale (not shown), a predetermined amount of each of the chocolate materials (A, B) of different colors to each of the passages (31a, 31b) in the upper nozzle plate 31 under pressure, using the nozzle assembly and the mold shown in FIG. 9.

FIG. 10(a) is a perspective view of decorative chocolate 30 produced using the nozzle assembly and the mold shown in FIG. 9. Even repeated production resulted in decorative chocolates having substantially identical patterns.

In the decorative chocolate 30, A and B are solidified chocolates of different colors corresponding to the chocolate material streams (A, B), respectively, described in FIG. 9. Each of the chocolates A and B appears repeatedly more than twice in the pattern. The alphabet C refers to the chocolate C solidified in advance in the mold 35 as described in FIG. 9. At the interfaces between the chocolates A and B, the colors of the chocolates were clearly distinguished, and the chocolates formed a smooth surface. The cross-section of the decorative chocolate taken along line b—b in FIG. 10(a) is as shown in FIG. 10(b). Further, the cross-section of the decorative chocolate taken along line c—c in FIG. 10(b) is as shown in FIG. 10(c), showing a pattern substantially similar to a pattern seen when the decorative chocolate 30 is seen from below. Therefore, it is understood that the decorative chocolate 30 has the pattern in two or more distinct colors not only on its surface, but also continuously into deep inside.

Example 6

All of FIGS. 11(a) to 11(e), except for FIG. 11(d), are identical with the nozzle assembly and the mold as shown in FIG. 9, so that they will not be discussed further.

Reference numeral 34 in FIG. 11(d) refers to a merging nozzle having a horizontal guide passage 34a, which is provided with fifteen apertures 34a' functioning as discharge ports. The merging nozzle 34 merges the chocolate material streams (A, B) discharged through the discharge ports (33a', 33b) of the lower nozzle plate 33, and guides the streams merged through apertures 34a' downward. Thus, in the streams (A, B) which are discharged from the merging nozzle 34, guided, and introduced into the mold 35, some portions are mixed before filling the mold 35, so that the interfaces between the different colors in the pattern of the resulting decorative chocolate will be graded as will be described later.

Figure 12:
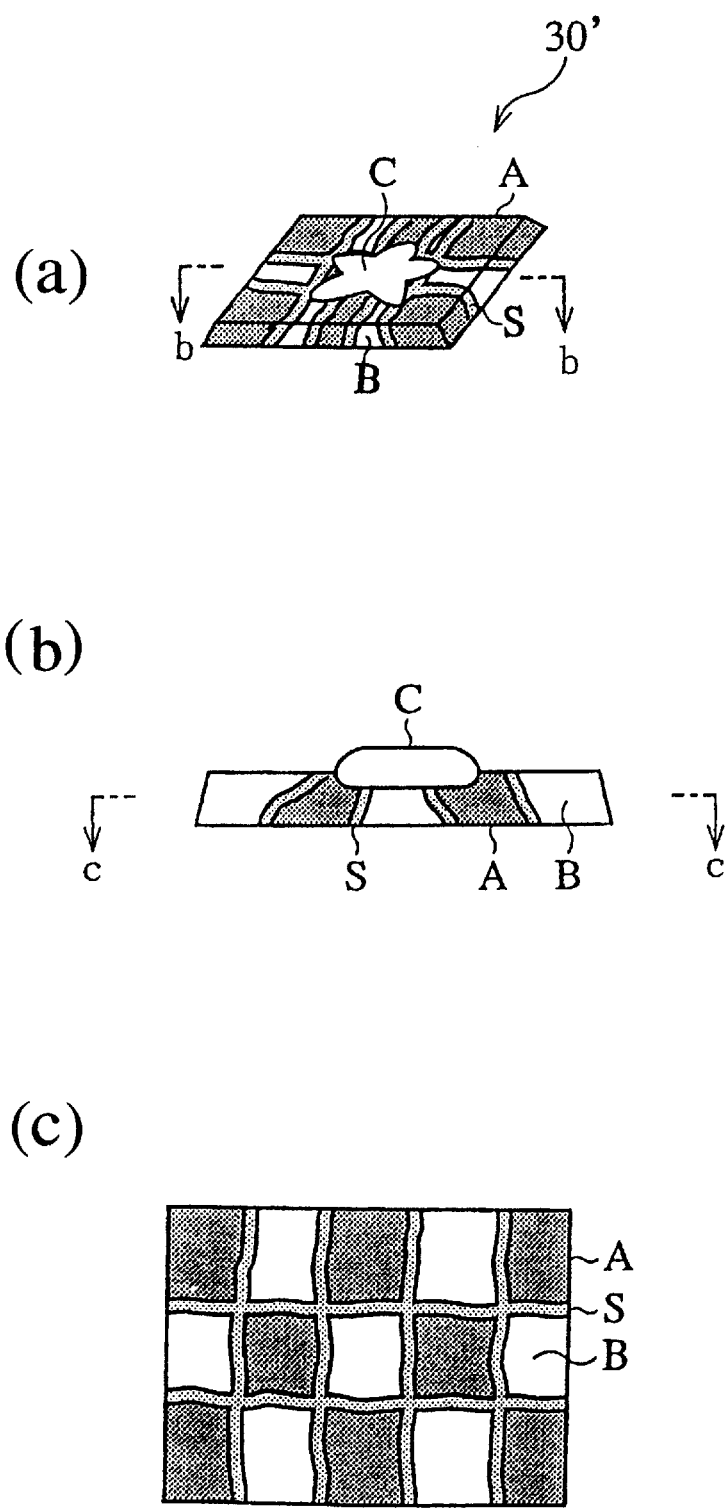
FIG. 12(a) is a perspective view of a decorative chocolate produced using the nozzle assembly of FIG. 1.
FIG. 12(b) is a vertical sectional view taken along line b—b in FIG. 12(a)
FIG. 12(c) is a cross-sectional view taken along line c—c in FIG. 12(b).
Figure 13:
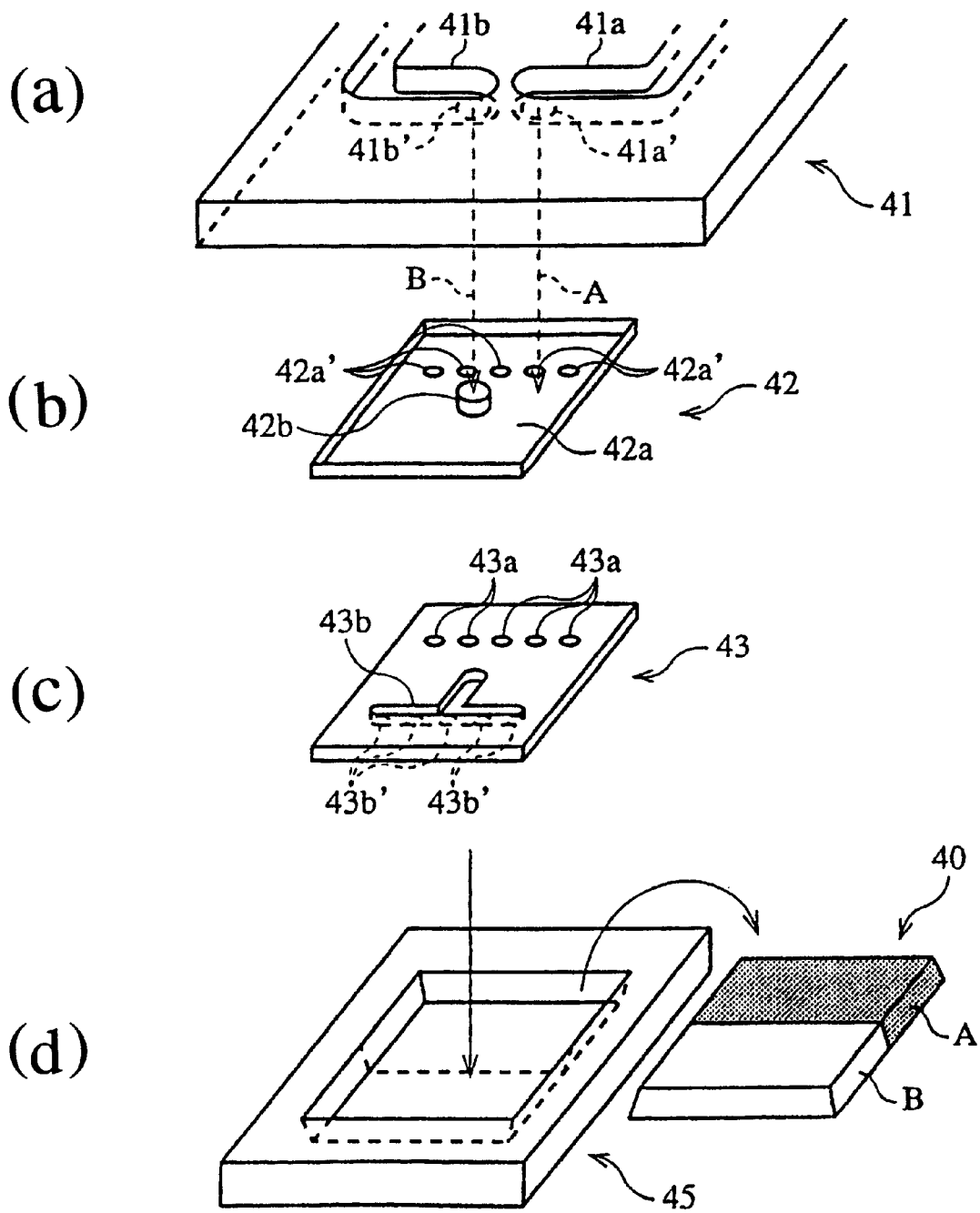
FIGS. 13(a) to (c) show in an exploded perspective view an embodiment of the nozzle assembly of the present invention.
FIG. 13(d) shows in perspective an example of a mold and a decorative chocolate obtained using the mold.
Figure 14:
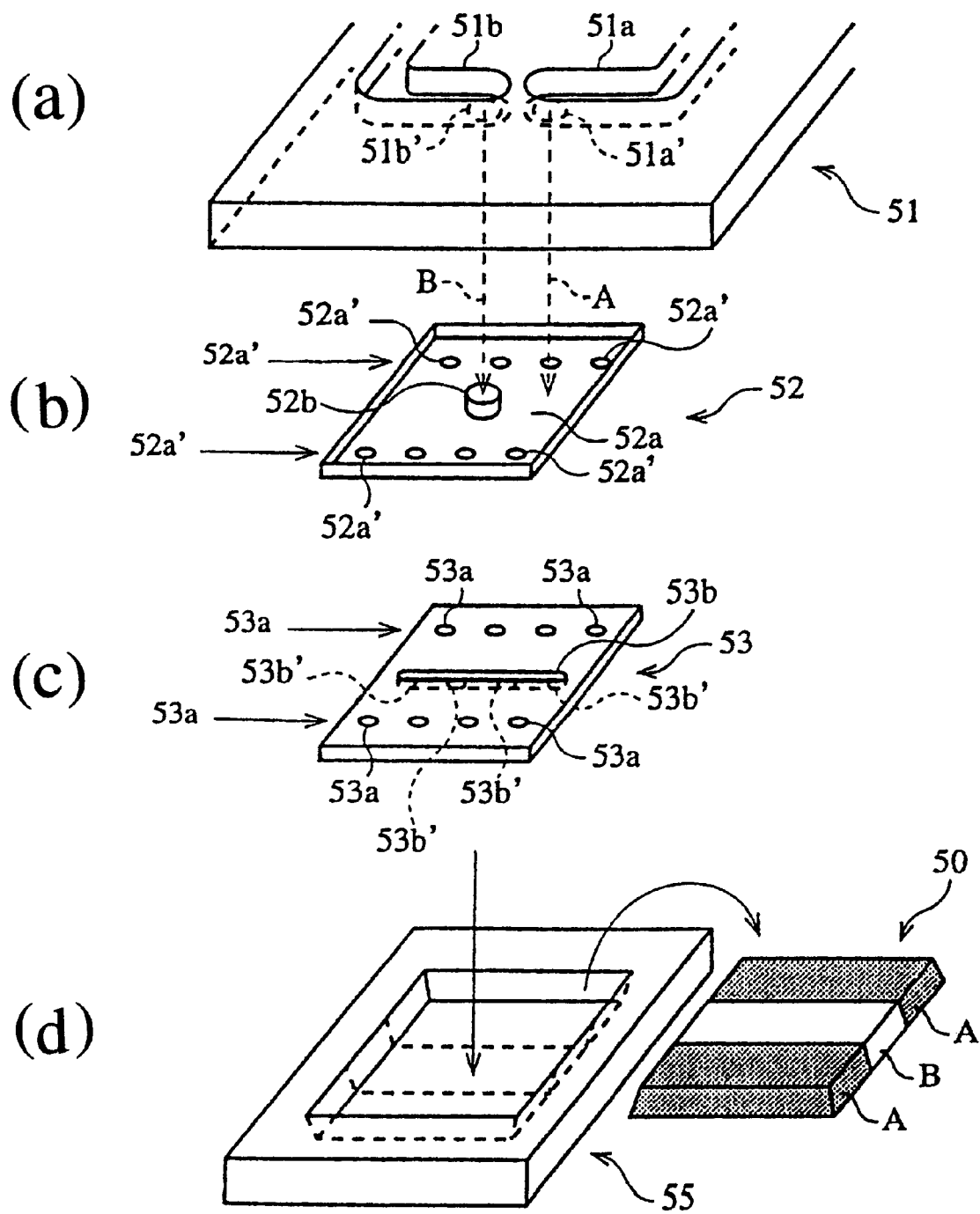
FIGS. 14(a) to 14(c) show in an exploded perspective view an embodiment of the nozzle assembly of the present invention.
FIG. 14(d) shows in perspective an example of a mold and a decorative chocolate obtained using the mold.
Figure 15:
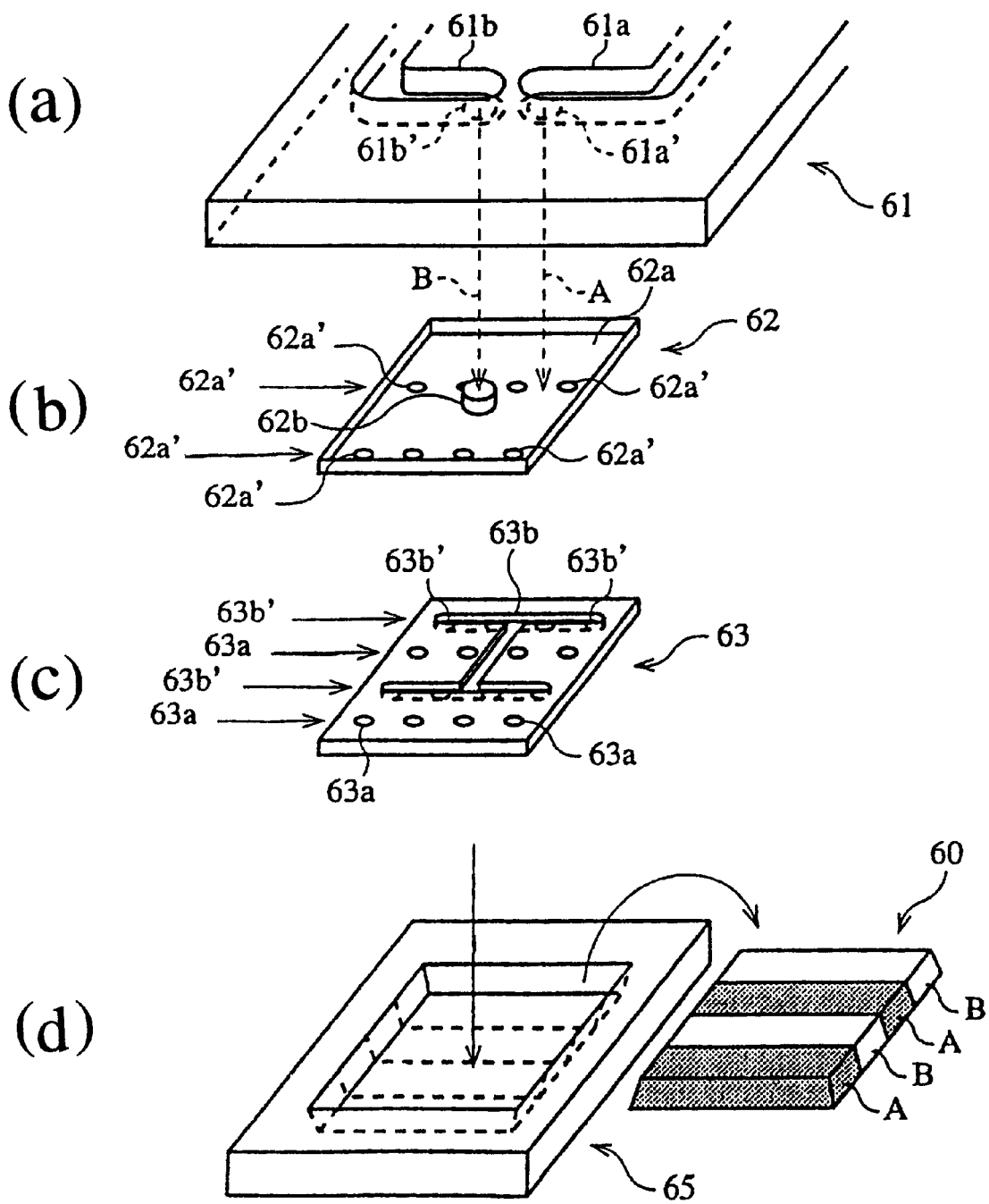
FIGS. 15(a) to 15(c) show in an exploded perspective view an embodiment of the nozzle assembly of the present invention.
FIG. 15(d) shows in perspective an example of a mold and a decorative chocolate obtained using the mold.
Figure 16:
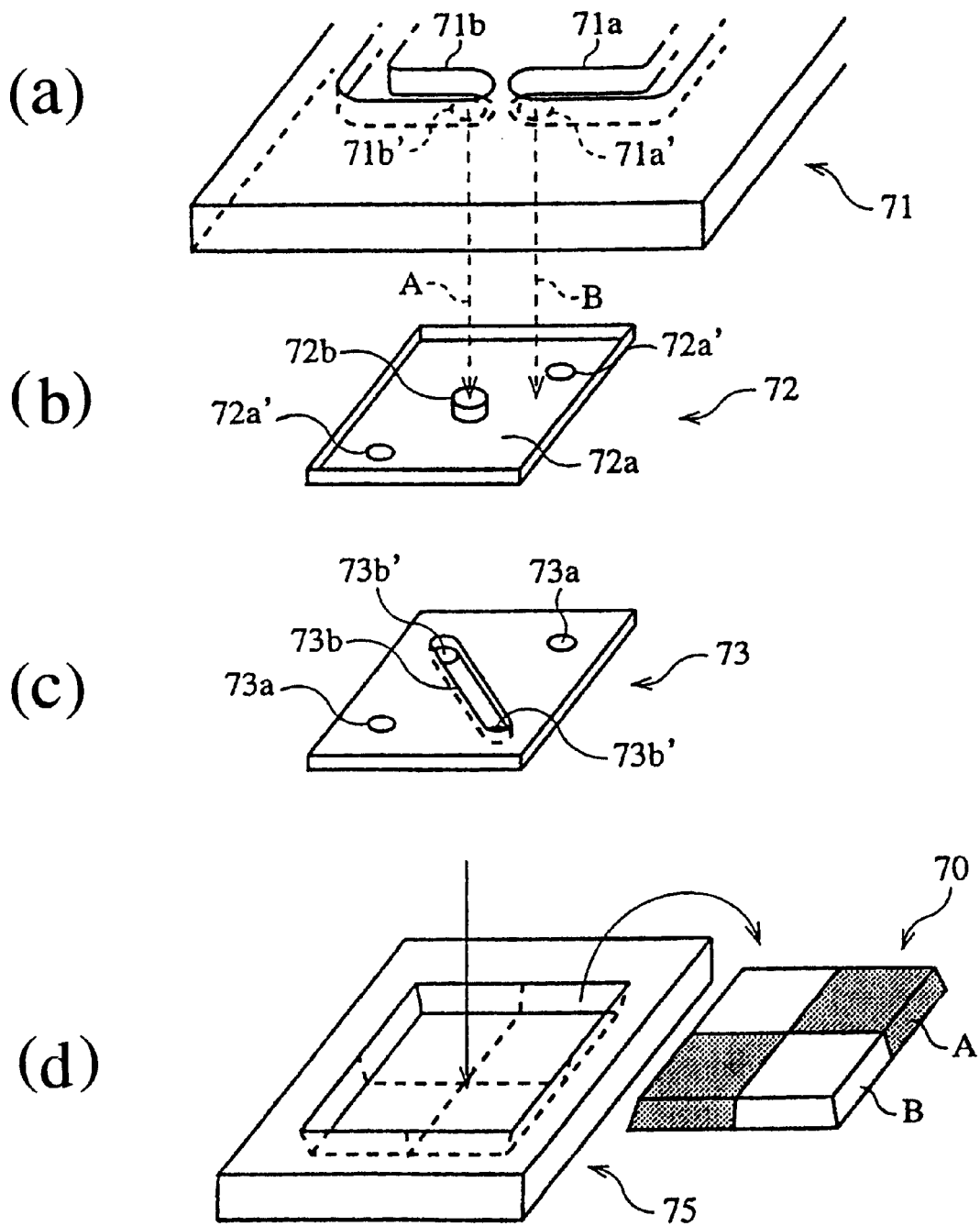
FIGS. 16(a) to 16(c) show in an exploded perspective view an embodiment of the nozzle assembly of the present invention.
FIG. 16(d) shows in perspective an example of a mold and a decorative chocolate obtained using the mold.
Figure 17:
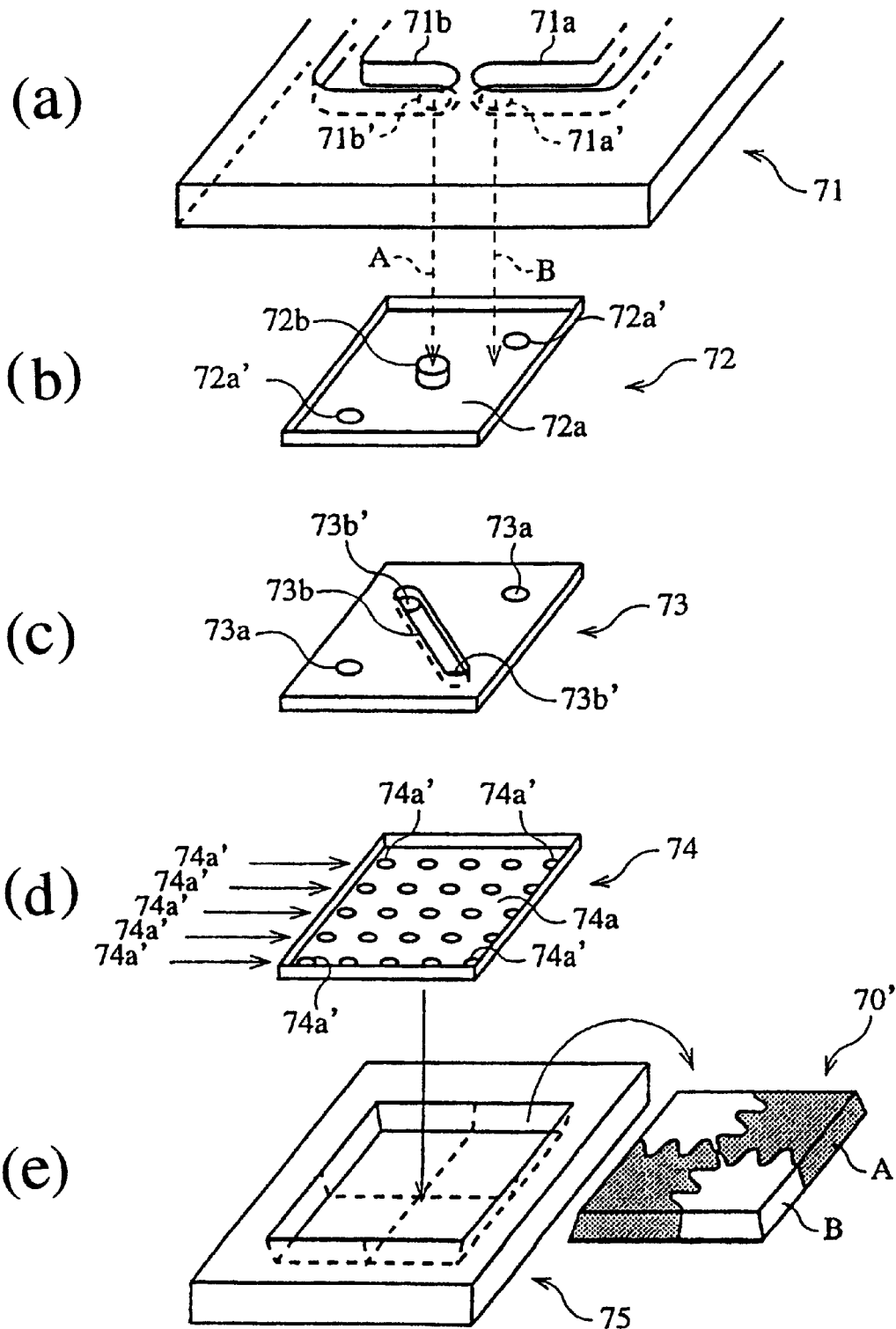
FIGS. 17(a) to 17(d) show in an exploded perspective view an embodiment of the nozzle assembly of the present invention.
FIG. 17(e) shows in perspective an example of a mold and a decorative chocolate obtained using the mold.
Figure 18:
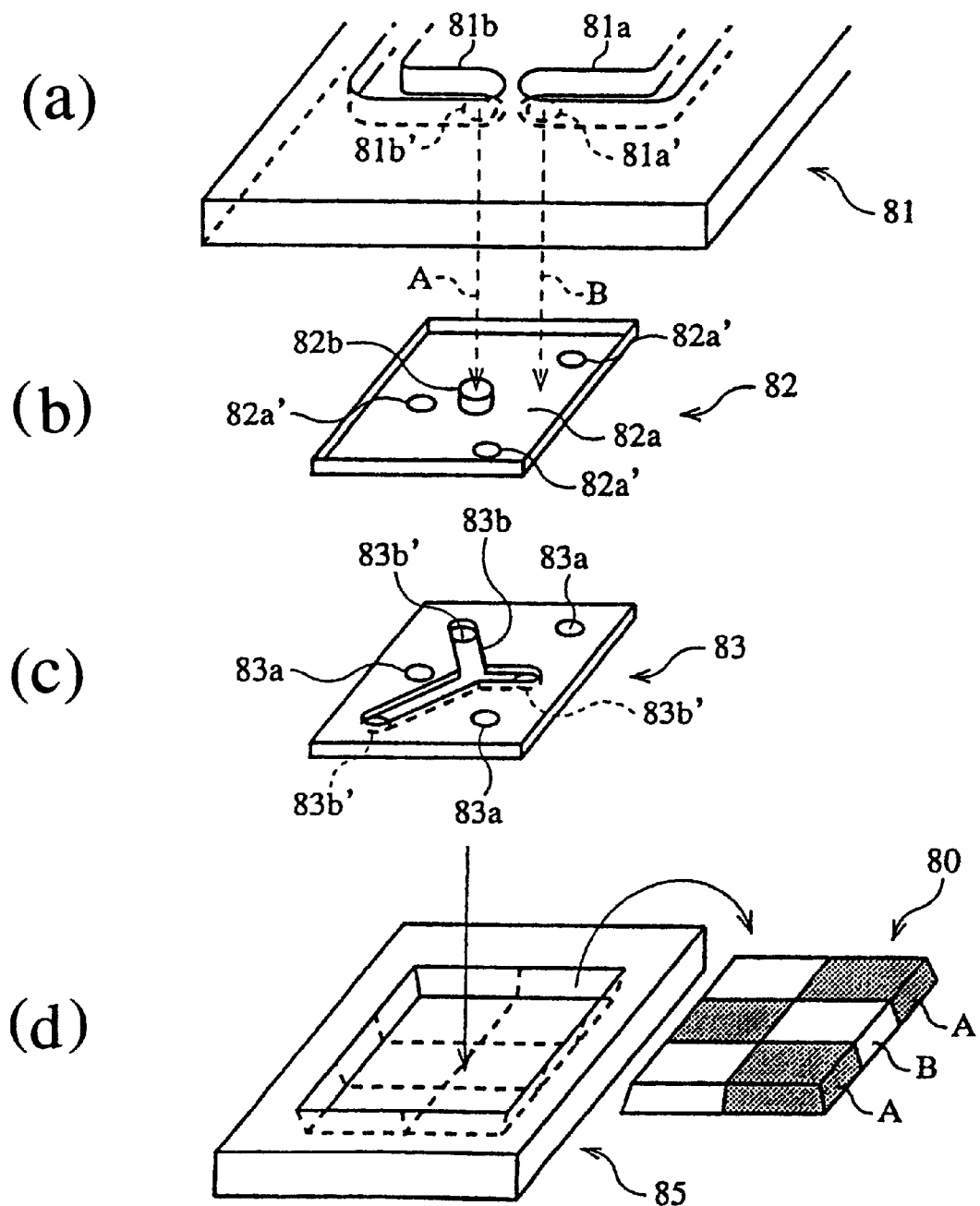
FIGS. 18(a) to 18(c) show in an exploded perspective view an embodiment of the nozzle assembly of the present invention.
FIG. 18(d) shows in perspective an example of a mold and a decorative chocolate obtained using the mold.
Figure 19:
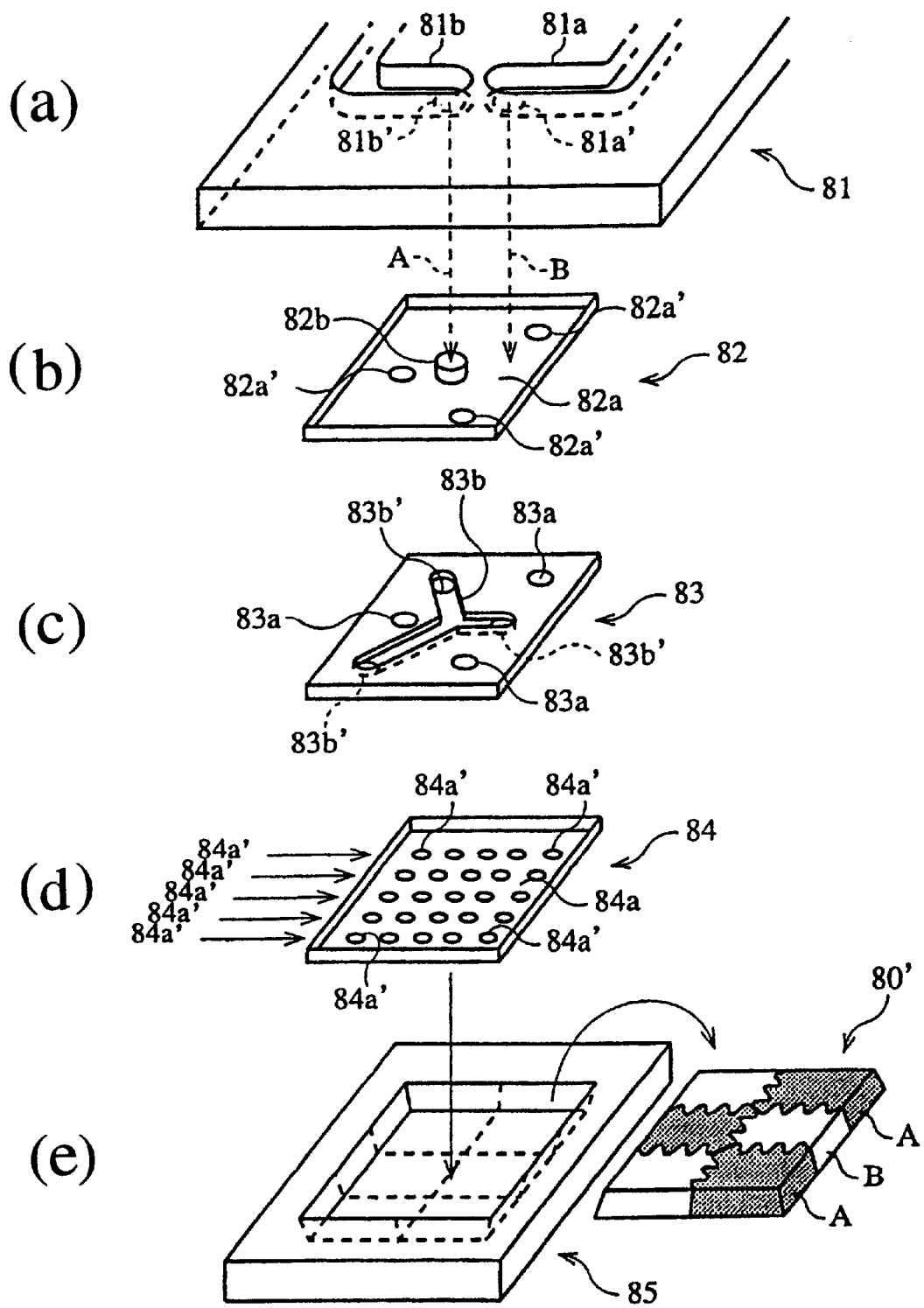
FIGS. 19(a) to 19(d) show in an exploded perspective view an embodiment of the nozzle assembly of the present-invention.
FIG. 19(e) shows in perspective an example of a mold and a decorative chocolate obtained using the mold.
Figure 20:
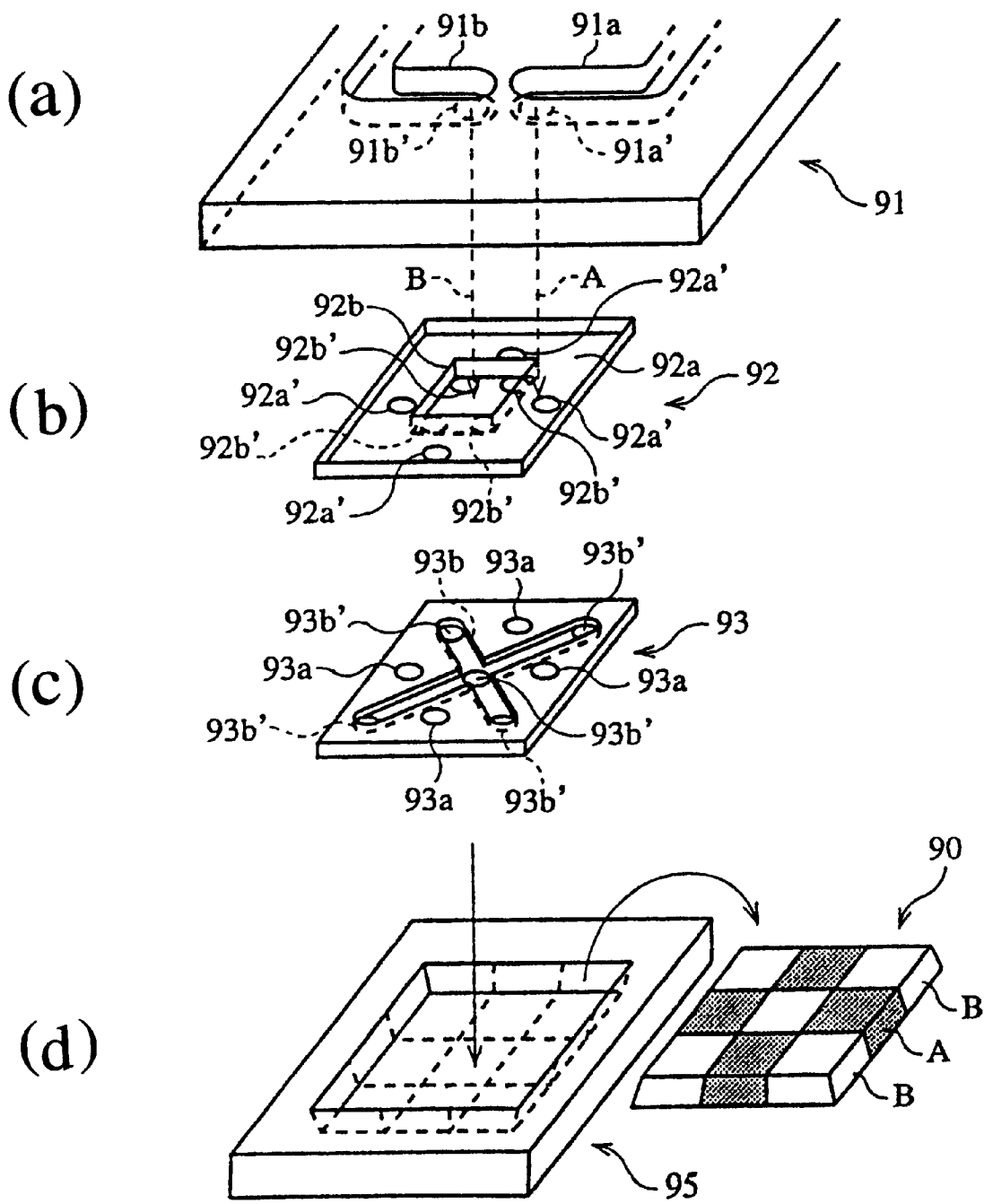
FIGS. 20(a) to 20(c) show in an exploded perspective view an embodiment of the nozzle assembly of the present invention.
FIG. 20(d) shows in perspective an example of a mold and a decorative chocolate obtained using the mold.
Figure 21:
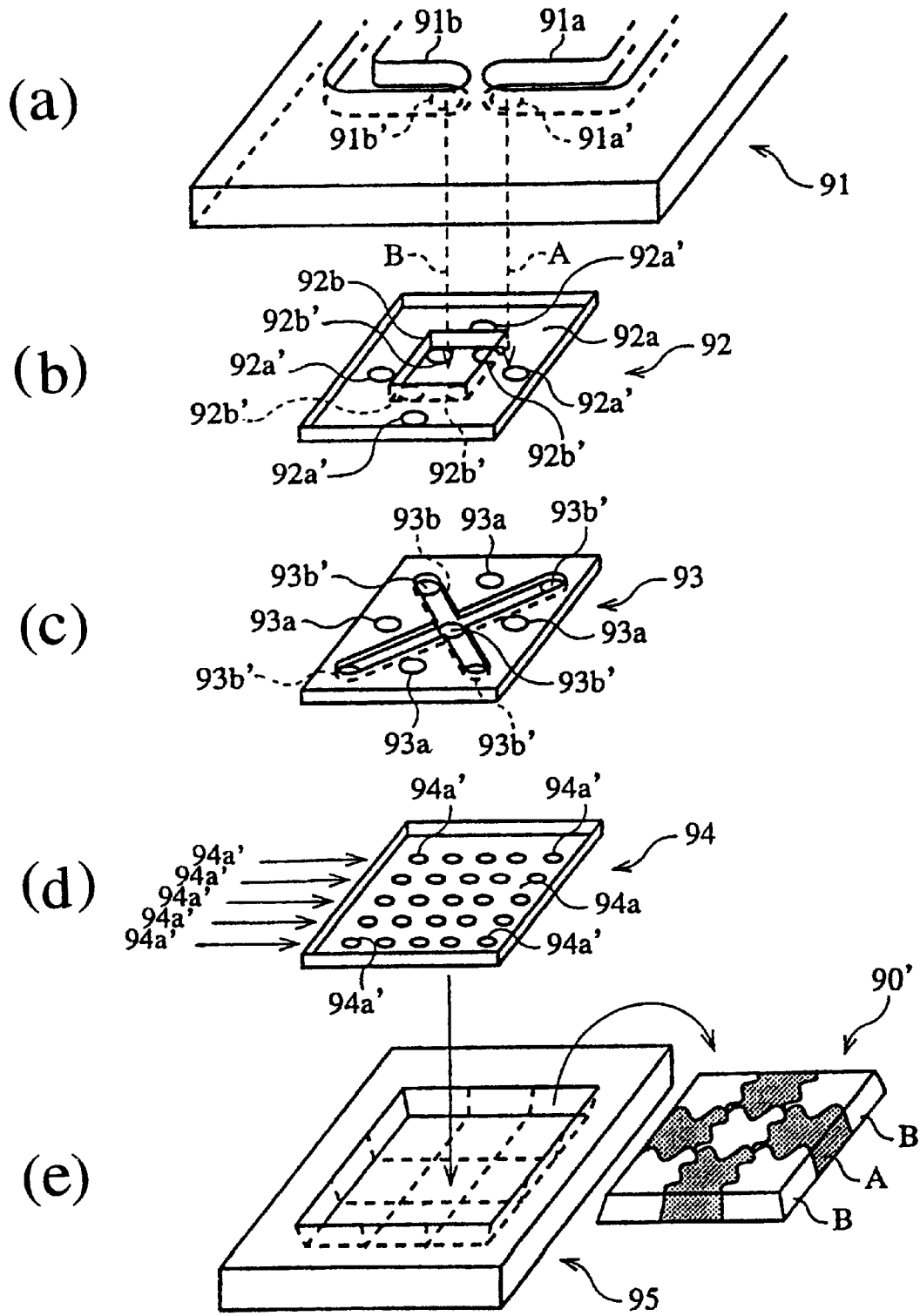
FIGS. 21(a) to 21(d) show in an exploded perspective view an embodiment of the nozzle assembly of the present invention.
FIG. 21(e) shows in perspective an example of a mold and a decorative chocolate obtained using the mold.
Figure 22:
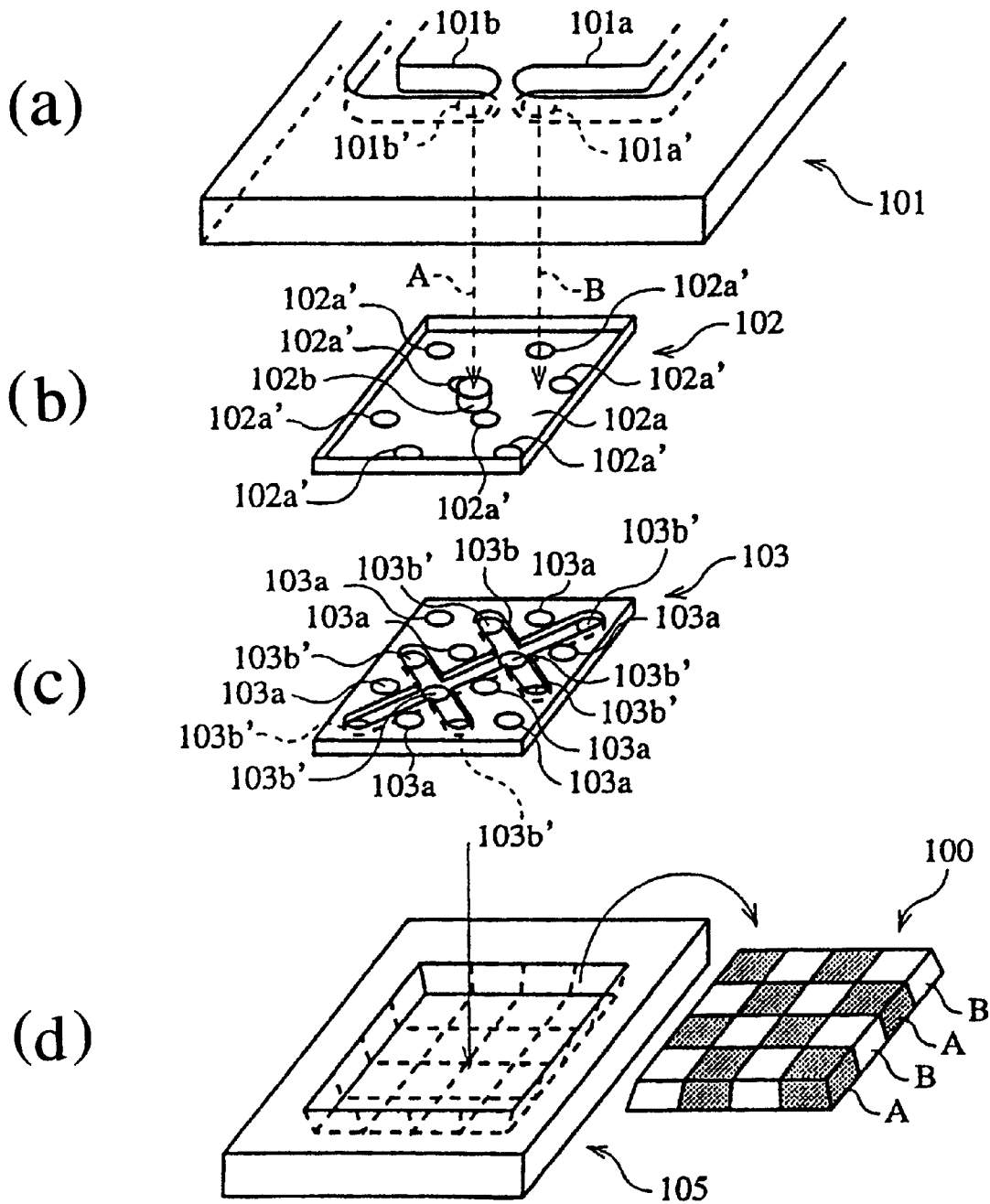
FIGS. 22(a) to 22(c) show in an exploded perspective view an embodiment of the nozzle assembly of the present invention.
FIG. 22(d) shows in perspective an example of a mold and a decorative chocolate obtained using the mold.
Figure 23:
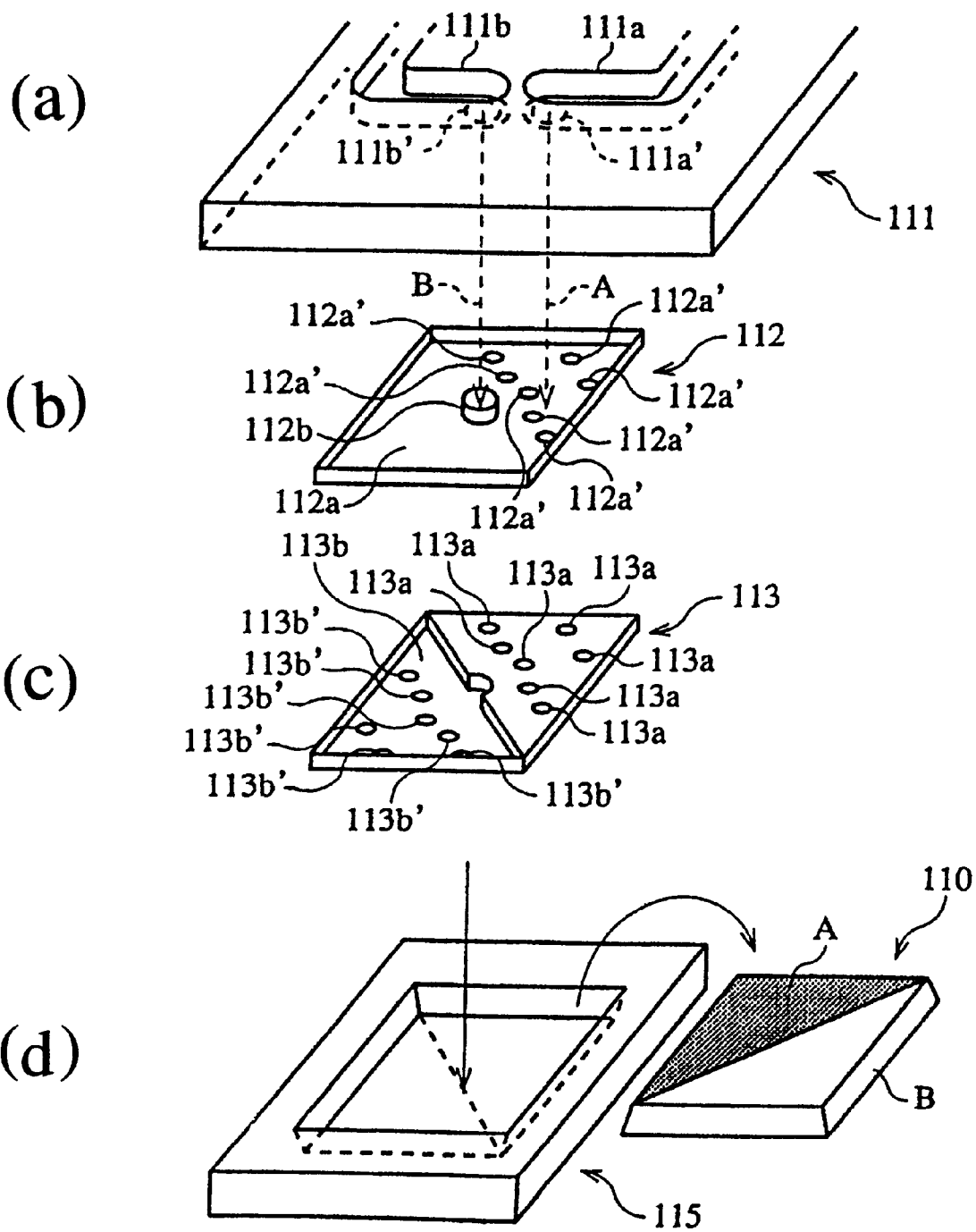
FIGS. 23(a) to 23(c) show in an exploded perspective view an embodiment of the nozzle assembly of the present invention.
FIG. 23(d) shows in perspective an example of a mold and a decorative chocolate obtained using the mold.
Figure 24:
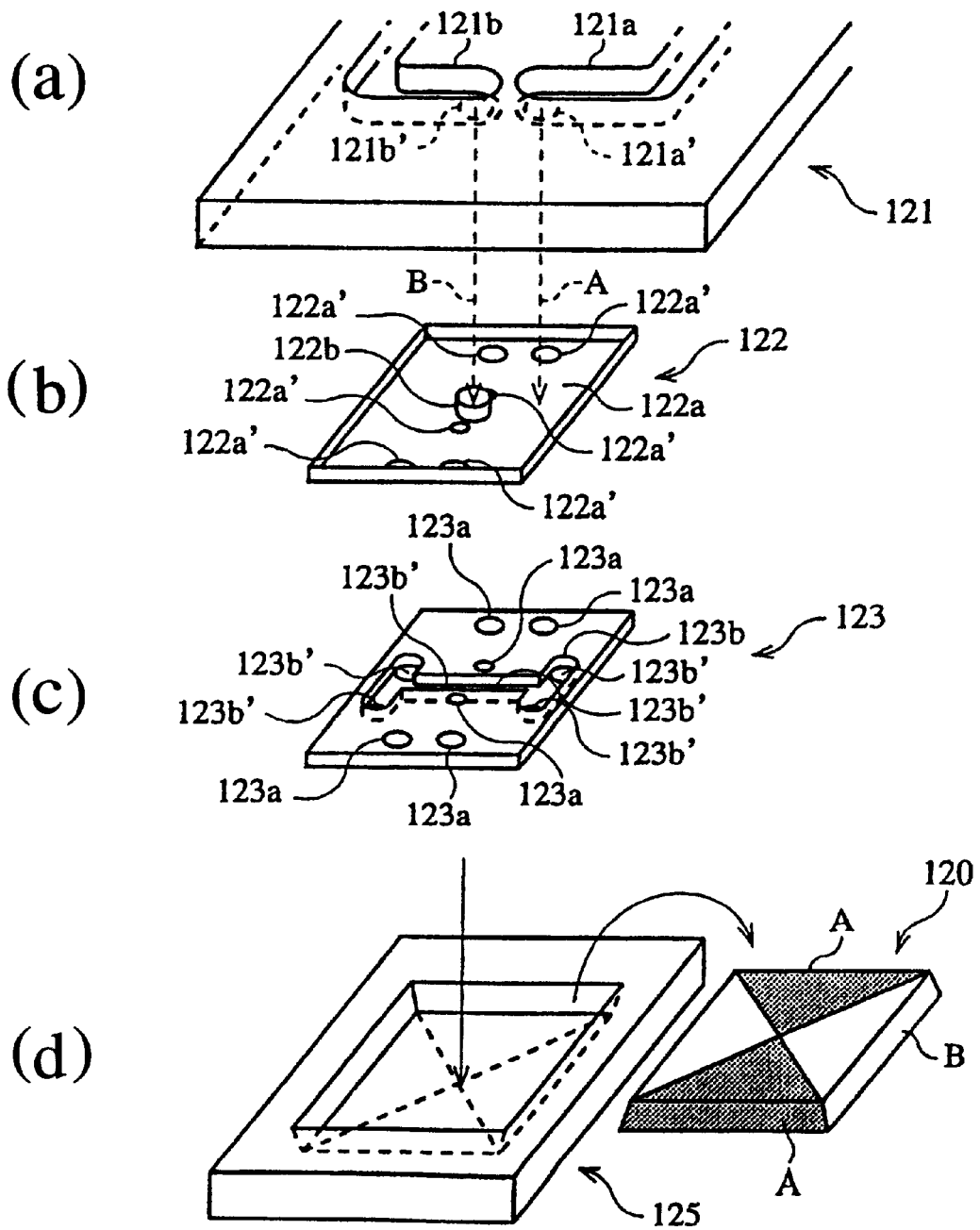
FIGS. 24(a) to 24(c) show in an exploded perspective view an embodiment of the nozzle assembly of the present invention.
FIG. 24(d) shows in perspective an example of a mold and a decorative chocolate obtained using the mold.
Figure 25:
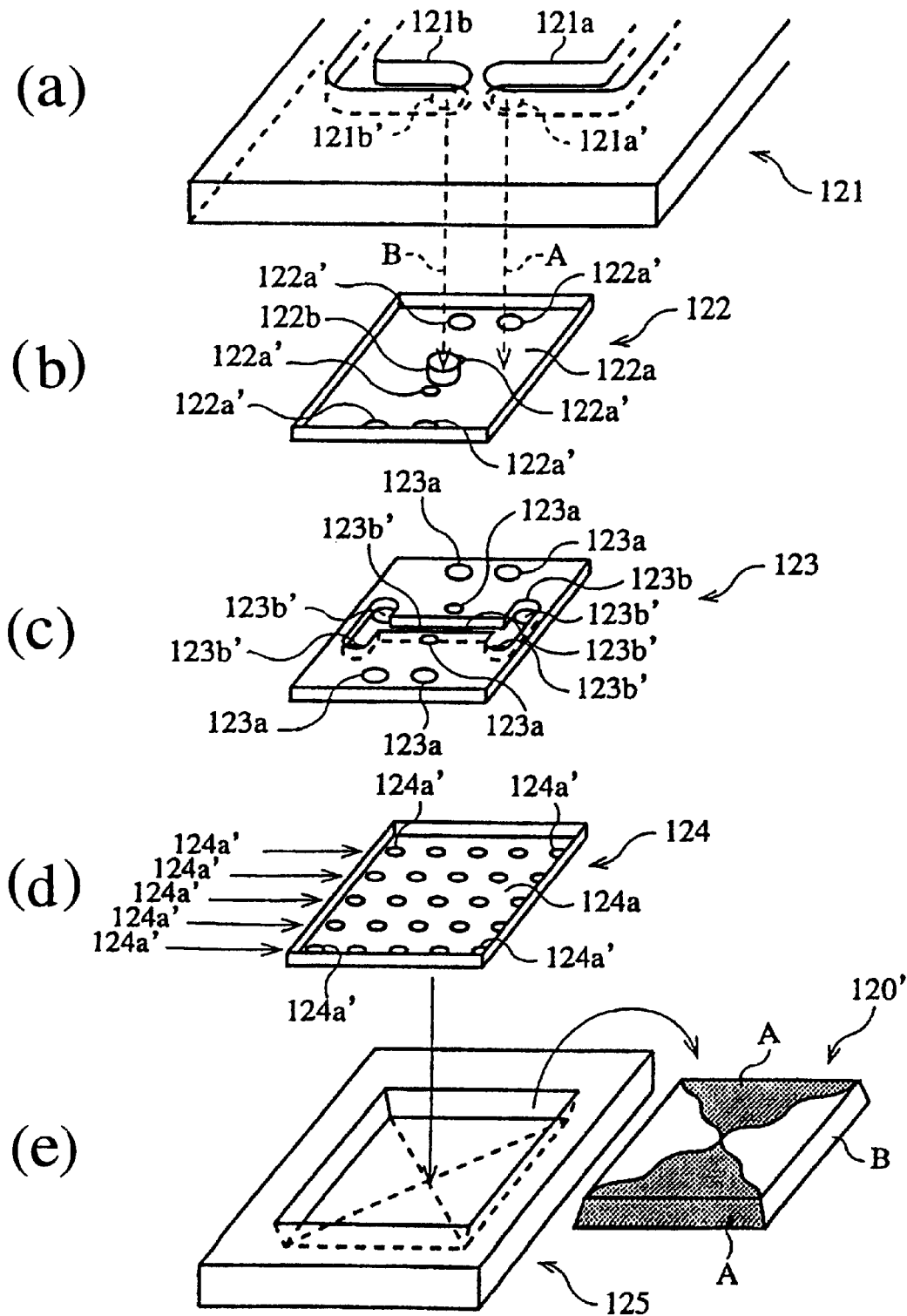
FIGS. 25(a) to 25(d) show in an exploded perspective view an embodiment of the nozzle assembly of the present invention.
FIG. 25(e) shows in perspective an example of a mold and a decorative chocolate obtained using the mold.

Referring to FIG. 12, a decorative chocolate produced using the nozzle assembly and the mold shown in FIG. 11 is briefly described in the same way as in Example 5.

FIG. 12(a) is a perspective view of decorative chocolate 30' produced using the nozzle assembly and the mold shown in FIG. 11. Even repeated production resulted in decorative chocolates having substantially identical patterns.

In the decorative chocolate 30', A and B are solidified chocolates of different colors corresponding to the chocolate material streams (A, B) respectively, described in FIG. 11. Each of the chocolates A and B appears repeatedly more than twice in the pattern. The alphabet C refers to the chocolate C solidified in advance in the mold 35 as described in FIG. 11. At the interfaces between the chocolates A and B, graded patterns S are formed wherein the colors of the chocolates A and B are mixed. However, the chocolates A and B of different colors are separate by the graded patterns S. The surface of the interfaces and the graded patterns S were all smooth. Further, the cross-section of the decorative chocolate taken along line b—b in FIG. 12(a) is as shown in FIG. 12(b). The cross-section of the decorative chocolate taken along line c—c in FIG. 12(b) is as shown in FIG. 12(c), showing a pattern substantially similar to a pattern seen when the decorative chocolate 30' shown in FIG. 12(*a*) is seen from below. Therefore, it is understood that the decorative chocolate 30 has the pattern in two or more distinct colors not only on its surface, but also continuously into deep inside.

Examples 7–19

With each nozzle assembly and mold shown in FIGS. 13 to 25, a decorative chocolate shown in each of these figures is produced. These decorative chocolates are other embodiments of the present invention obtained by modifying the nozzle assemblies described in Examples 1 to 6. Every decorative chocolate produced using each of the nozzle assemblies has a pattern in two or more distinct colors not only on its surface, but also continuously into deep inside, and the surfaces of the interfaces between the chocolates of different colors are smooth, like the chocolates in Examples 1 to 6.

The nozzle assemblies and molds shown in FIGS. 13 to 25 are other embodiments of the present invention as modification of the nozzle assemblies described in Examples 1 to 6. Basic function and usage of each nozzle plate, merging nozzle, and mold can be exploited based on Examples 1 to 6, so that they will not be discussed further, and only the reference numerals in these figures are described.

Reference numerals 41, 51, 61, 71, 81, 91, 101, 111, and 121 refer to an upper nozzle plate. Reference numerals 41*a*, 41*b*, 51*a*, 51*b*, 61*a*, 61*b*, 71*a*, 71*b*, 81*a*, 81*b*, 91*a*, 91*b*, 101*a*, 101*b*, 111*a*, 111*b*, 121*a*, and 121*b* refer to a passage which horizontally guides a chocolate material. Reference numerals 41*a'*, 41*b'*, 51*a'*, 51*b'*, 61*a'*, 61*b'*, 71*a'*, 71*b'*, 81*a'*, 81*b'*, 91*a'*91*b'*, 101*a'*, 101*b'*, 111*a'*, 111*b'*, 121*a'*, and 121*b'* refer to a communication port. Reference numerals 42, 43, 52, 53, 62, 63, 72, 73, 82, 83, 92, 93, 102, 103, 112, 113, 122, and 123 refer to a lower nozzle plate. Reference numerals 42*a*, 43*b*, 52*a*, 53*b*, 62*a*, 63*b*, 72*a*, 73*b*, 82*a*, 83*b*, 92*a*, 93*b*, 102*a*, 103*b*, 112*a*, 113*b*, 122*a*, and 123*b* refer to a horizontal guiding passage. Reference numerals 42*a'*, 42*b'*, 43*a*, 43*b'*, 52*a'*, 52*b*, 53*a*, 53*b'*, 62*a'*, 62*b*, 63*a*, 63*b'*, 72*a'*, 72*b*, 73*a*, 73*b'*, 82*a'*, 82*b*, 83*a*, 83*b'*, 92*a'*, 92*b'*, 93*a*, 93*b'*, 102*a'*, 102*b*, 103*a*, 103*b'*, 112*a'*, 112*b*, 113*a*, 113*b'*, 122*a'*, 122*b*, 123*a*, and 123*b'* refer to a communication port or discharge port. Reference numerals 74, 84, 94, and 124 refer to a merging nozzle. Reference numerals 74*a'*, 84*a'*, 94*a'*, and 124*a'* refer to an aperture. Reference numerals 45, 55, 65, 75, 85, 95, 105, 115, and 125 refer to a mold. Reference numerals 40, 50, 60, 70, 70', 80, 80', 90, 90', 100, 110, 120, and 120' refer to a produced decorative chocolate.

Incidentally, FIGS. 17, 19, 21, and 25 show embodiments wherein a portion of the chocolate material streams A and B are merged through a merging nozzle before introduced into a mold. However, in these embodiments, the chocolate materials of different colors do not form graded patterns at the interfaces therebetween, but are clearly distinguished into two colors and formed wave patterns. This is believed to be caused by the size of the apertures provided in the merging nozzles, the viscosity of the chocolate materials, and other factors. Thus, graded patterns may be formed by modifying these factors.

The shape of the upper nozzle plates, lower nozzle plates, and merging nozzles for the nozzle assembly of the present invention is not particularly limited, and may be selected from a variety of shapes such as circular, triangular, or rectangular shape for forming a desired pattern. The size of these members may also be suitably selected depending on the size of the decorative food to be produced, and the number of decorative foods to be produced at a time.

What is claimed is:

1. A method for producing decorative food having a pattern in two or more distinct colors by introducing at least two fluidized food materials of different colors into a mold having one or more unit cavities, comprising the steps of:

separately measuring out a predetermined amount of each of said food materials for introduction into said mold, separately but substantially simultaneously supplying each of said measured food materials to an introduction region above a nozzle assembly, said nozzle assembly including an upper nozzle plate and at least one lower nozzle plate, each of said upper and lower nozzle plates having at least one discrete passage for each of said food materials, separately supplying each of said food materials from each introduction region to each corresponding discrete passage in said nozzle assembly, advancing each of said food materials in a substantially horizontal direction in said nozzle assembly, while a stream of each of said food materials is branched to form branched streams of each of said food materials, separately discharging said branched streams of each of said food materials from lower portion of said nozzle assembly, substantially simultaneously introducing said separately discharged branched streams into one of said one or more unit cavities to allow merging of said streams, and solidifying merged streams of said food materials to form a solidified food, and demolding the solidified food.

2. A method for producing decorative food having a pattern in two or more distinct colors by introducing at least two fluidized food materials of different colors into a mold having one or more unit cavities, comprising the steps of:

separately measuring out a predetermined amount of each of said food materials for introducing into said mold, separately but substantially simultaneously supplying each of said measured food materials to an introduction region above a nozzle assembly, said nozzle assembly including an upper nozzle plate and at least one lower nozzle plate, each of said upper and lower nozzle plates having at least one discrete passage for each of said food materials, separately supplying each of said food materials from each introduction region to each corresponding discrete passage in said nozzle assembly, advancing each of said food materials in a substantially horizontal direction in said nozzle assembly, while a stream of each of said food materials is branched to form branched streams of each of said food materials, merging said branched streams of each of said food materials immediately before introduction into the mold, and discharging merged streams of said food materials from lower portion of said nozzle assembly, substantially simultaneously introducing discharged merged streams of said food materials into one of said one or more unit cavities, solidifying said merged streams of said food materials to form a solidified food, and demolding the solidified food.

3. The method of claim 1 or 2, wherein said food materials are fluidized chocolate materials.

4. A nozzle assembly branching each stream of at least two fluidized food materials of different colors into multiple streams, and guiding said multiple streams to predetermined locations in a mold having one or more unit cavities, said nozzle assembly comprising:

an upper nozzle plate, at least one lower nozzle plate positioned below and in contact with said upper nozzle plate, each of said upper and lower nozzle plates having at least one discrete passage for each of said food materials, each of said passages in said upper nozzle plate guiding one of said food materials in a substantially horizontal direction, and having at least one communication port each in communication with corresponding one of said passages in said lower nozzle plate, each of said passages in said lower nozzle plate having at least one discharge port for discharging one of said food materials into one of said one or more unit cavities, at least one of said passages in the lower nozzle plate being a horizontal guide passage for guiding one of said food materials in a substantially horizontal direction, wherein number of said at least one discharge port of each said horizontal guide passage is larger than number of said at least one communication port of a passage in the upper nozzle plate each in communication with said horizontal guide passage.

5. The nozzle assembly of claims 4 wherein said nozzle assembly has a plurality of said lower nozzle plates vertically in contact with each other.

6. The nozzle assembly of claim 4 further comprising a merging nozzle positioned below said lower nozzle plate, wherein said merging nozzle merges streams of said food materials in different colors discharged separately from the lower nozzle plate, and introduces merged streams of said food materials into one of said one or more unit cavities.

* * * * *